(12) United States Patent
Mikulak et al.

(10) Patent No.: US 10,493,695 B2
(45) Date of Patent: Dec. 3, 2019

(54) ADDITIVE MANUFACTURING METHOD FOR BUILDING THREE-DIMENSIONAL OBJECTS WITH CORE-SHELL ARRANGEMENTS, AND THREE-DIMENSIONAL OBJECTS THEREOF

(71) Applicant: Stratasys, Inc., Eden Prairie, MN (US)

(72) Inventors: James K. Mikulak, Austin, TX (US); Carl R. Deckard, Austin, TX (US); Robert L. Zinniel, Plymouth, MN (US)

(73) Assignee: STRATASYS, INC., Eden Prairie, MN (US)

( * ) Notice: Subject to any disclaimer, the term of this patent is extended or adjusted under 35 U.S.C. 154(b) by 107 days.

(21) Appl. No.: 15/659,190

(22) Filed: Jul. 25, 2017

(65) Prior Publication Data
US 2017/0320266 A1  Nov. 9, 2017

Related U.S. Application Data

(60) Division of application No. 13/855,945, filed on Apr. 3, 2013, now Pat. No. 9,738,031, which is a division
(Continued)

(51) Int. Cl.
*B29C 64/188* (2017.01)
*B33Y 70/00* (2015.01)
(Continued)

(52) U.S. Cl.
CPC ........ *B29C 64/188* (2017.08); *B29C 48/0021* (2019.02); *B29C 48/05* (2019.02);
(Continued)

(58) Field of Classification Search
CPC .................................................. B29C 47/0014
(Continued)

(56) References Cited

U.S. PATENT DOCUMENTS

| 3,509,013 A | 4/1970 | Oppenlander |
| 4,247,508 A | 1/1981 | Housholder |

(Continued)

FOREIGN PATENT DOCUMENTS

| FR | 2854764 A1 | 11/2004 |
| GB | 816016 | 7/1959 |

(Continued)

OTHER PUBLICATIONS

International Search Report and Written Opinion dated Feb. 22, 2012 for International Application No. PCT/US2011/051735 filed Sep. 15, 2011.

*Primary Examiner* — Brent T O'Hern
(74) *Attorney, Agent, or Firm* — Westman, Champlin & Koehler, P.A.

(57) ABSTRACT

A consumable filament for use in an extrusion-based additive manufacturing system, where the consumable filament comprises a core portion of a first thermoplastic material, and a shell portion of a second thermoplastic material that is compositionally different from the first thermoplastic material, where the consumable filament is configured to be melted and extruded to form roads of a plurality of solidified layers of a three-dimensional object, and where the roads at least partially retain cross-sectional profiles corresponding to the core portion and the shell portion of the consumable filament.

18 Claims, 18 Drawing Sheets

Related U.S. Application Data of application No. 13/419,669, filed on Mar. 14, 2012, now Pat. No. 8,920,697, which is a continuation-in-part of application No. 13/233,280, filed on Sep. 15, 2011, now Pat. No. 8,801,990.

(60) Provisional application No. 61/383,844, filed on Sep. 17, 2010.

(51) Int. Cl.
| | |
|---|---|
| *B29C 64/118* | (2017.01) |
| *B29C 48/05* | (2019.01) |
| *B29C 48/07* | (2019.01) |
| *B29C 48/16* | (2019.01) |
| *B29C 48/00* | (2019.01) |
| *B29C 48/21* | (2019.01) |
| *B29C 48/154* | (2019.01) |
| *D01F 8/04* | (2006.01) |
| *B32B 3/26* | (2006.01) |
| *D01F 8/12* | (2006.01) |
| *B29C 64/40* | (2017.01) |
| *B33Y 10/00* | (2015.01) |
| *B33Y 80/00* | (2015.01) |
| *B29C 48/92* | (2019.01) |

(52) U.S. Cl.
CPC ............ *B29C 48/07* (2019.02); *B29C 48/154* (2019.02); *B29C 48/16* (2019.02); *B29C 48/21* (2019.02); *B29C 64/118* (2017.08); *B29C 64/40* (2017.08); *B32B 3/26* (2013.01); *B33Y 70/00* (2014.12); *D01F 8/04* (2013.01); *D01F 8/12* (2013.01); *B29C 48/92* (2019.02); *B29C 2948/92704* (2019.02); *B33Y 10/00* (2014.12); *B33Y 80/00* (2014.12); *Y10T 428/23* (2015.01); *Y10T 428/24612* (2015.01); *Y10T 428/2929* (2015.01)

(58) Field of Classification Search
USPC .......................................................... 428/98
See application file for complete search history.

(56) References Cited

U.S. PATENT DOCUMENTS

| | | |
|---|---|---|
| 4,397,986 A | 8/1983 | Hornbaker |
| 4,551,369 A | 11/1985 | Belz |
| 4,671,982 A | 6/1987 | Belz |
| 4,863,538 A | 9/1989 | Deckard |
| 4,870,148 A | 9/1989 | Belz et al. |
| 4,886,856 A | 12/1989 | Chen et al. |
| 4,938,816 A | 7/1990 | Beaman et al. |
| 4,944,817 A | 7/1990 | Bourell et al. |
| 5,017,753 A | 5/1991 | Deckard |
| 5,053,090 A | 10/1991 | Beaman et al. |
| 5,076,869 A | 12/1991 | Bourell et al. |
| 5,121,329 A | 6/1992 | Crump |
| 5,132,143 A | 7/1992 | Deckard |
| 5,155,324 A | 10/1992 | Deckard et al. |
| 5,296,062 A | 3/1994 | Bourell et al. |
| 5,303,141 A | 4/1994 | Batchelder et al. |
| 5,316,580 A | 5/1994 | Deckard |
| 5,340,433 A | 8/1994 | Crump |
| 5,342,919 A | 8/1994 | Dickens, Jr. et al. |
| 5,382,308 A | 1/1995 | Bourell et al. |
| 5,402,351 A | 3/1995 | Batchelder et al. |
| 5,474,719 A | 12/1995 | Fan et al. |
| 5,503,785 A | 4/1996 | Crump et al. |
| 5,527,877 A | 6/1996 | Dickens, Jr. et al. |
| 5,597,589 A | 1/1997 | Deckard |
| 5,616,294 A | 4/1997 | Deckard |
| 5,639,070 A | 6/1997 | Deckard |
| 5,648,450 A | 7/1997 | Dickens, Jr. et al. |
| 5,653,925 A | 8/1997 | Batchelder |
| 5,695,707 A | 12/1997 | Almquist et al. |
| 5,764,521 A | 6/1998 | Batchelder et al. |
| 5,863,885 A | 1/1999 | Ruggieri et al. |
| 5,866,058 A * | 2/1999 | Batchelder ............ B29C 64/106 264/237 |
| 5,939,008 A | 8/1999 | Comb et al. |
| 5,990,268 A | 11/1999 | Dickens, Jr. et al. |
| 6,004,124 A | 12/1999 | Swanson et al. |
| 6,022,207 A | 2/2000 | Dahlin et al. |
| 6,067,480 A | 5/2000 | Stuffle et al. |
| 6,070,107 A | 5/2000 | Lombardi et al. |
| 6,129,872 A | 10/2000 | Jang |
| 6,136,948 A | 10/2000 | Dickens, Jr. et al. |
| 6,153,703 A | 11/2000 | Lustiger et al. |
| 6,165,406 A | 12/2000 | Jang et al. |
| 6,175,422 B1 | 1/2001 | Penn et al. |
| 6,228,923 B1 | 5/2001 | Lombardi et al. |
| 6,245,281 B1 | 6/2001 | Scholten et al. |
| 6,572,807 B1 | 6/2003 | Fong |
| 6,645,412 B2 | 11/2003 | Priedeman, Jr. |
| 6,722,872 B1 | 4/2004 | Swanson et al. |
| 6,790,403 B1 | 9/2004 | Priedeman, Jr. et al. |
| 6,814,907 B1 | 11/2004 | Comb |
| 6,923,634 B2 | 8/2005 | Swanson et al. |
| 7,077,638 B2 | 7/2006 | Leyden et al. |
| 7,122,246 B2 | 10/2006 | Comb et al. |
| 7,236,166 B2 | 6/2007 | Zinniel et al. |
| 7,255,821 B2 | 8/2007 | Priedeman, Jr. et al. |
| 7,384,255 B2 | 6/2008 | LaBossiere et al. |
| 7,604,470 B2 | 10/2009 | LaBossiere et al. |
| 7,625,200 B2 | 12/2009 | Leavitt |
| 7,648,609 B2 | 1/2010 | Leder et al. |
| 7,754,807 B2 | 7/2010 | Priedeman, Jr. et al. |
| 7,794,647 B1 | 9/2010 | Deckard |
| 8,221,669 B2 * | 7/2012 | Batchelder ............ B32B 38/185 264/308 |
| 2004/0222561 A1 | 11/2004 | Hopkins |
| 2005/0004282 A1 | 1/2005 | Priedeman, Jr. et al. |
| 2005/0129941 A1 | 6/2005 | Comb et al. |
| 2005/0173838 A1 | 8/2005 | Priedeman, Jr. et al. |
| 2007/0123092 A1 | 5/2007 | Legrand |
| 2008/0213419 A1 | 9/2008 | Skubic et al. |
| 2009/0274540 A1 | 11/2009 | Batchelder et al. |
| 2010/0096072 A1 | 4/2010 | Hopkins et al. |
| 2010/0096485 A1 | 4/2010 | Taatjes et al. |
| 2010/0096489 A1 | 4/2010 | Taatjes et al. |
| 2010/0190005 A1 | 7/2010 | Nair et al. |

FOREIGN PATENT DOCUMENTS

| | | |
|---|---|---|
| WO | 200020215 A1 | 4/2000 |
| WO | 2010018789 A1 | 2/2010 |

* cited by examiner

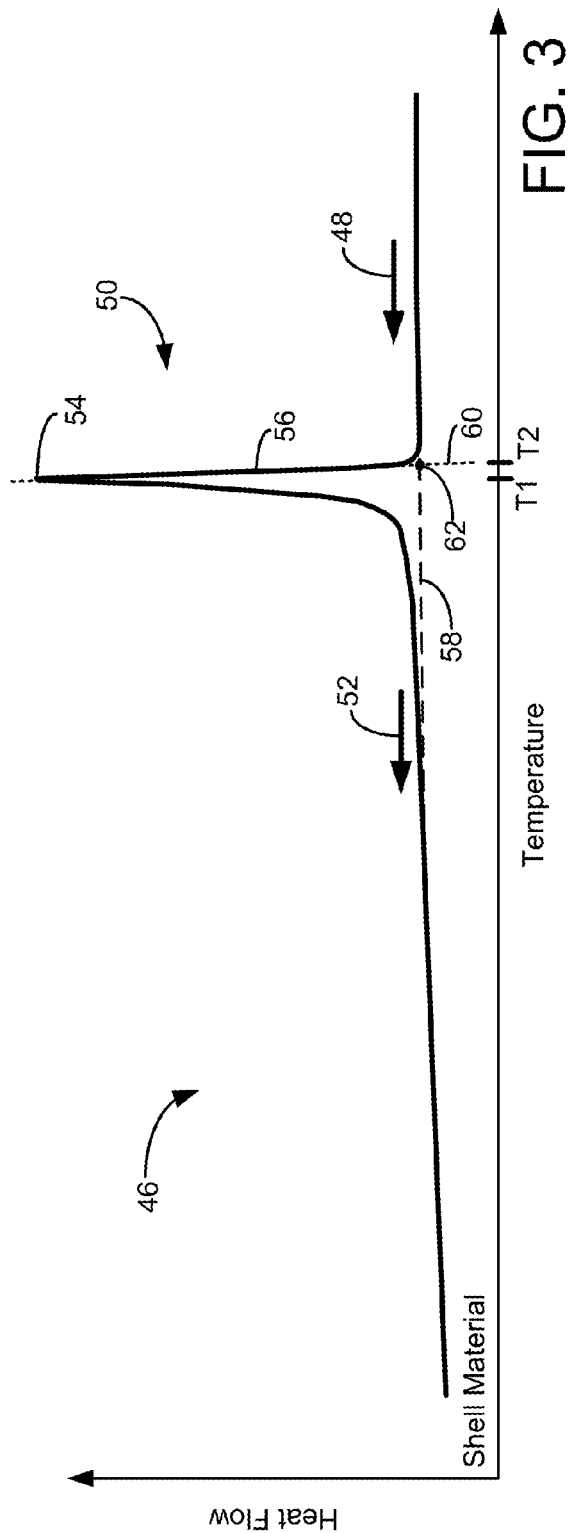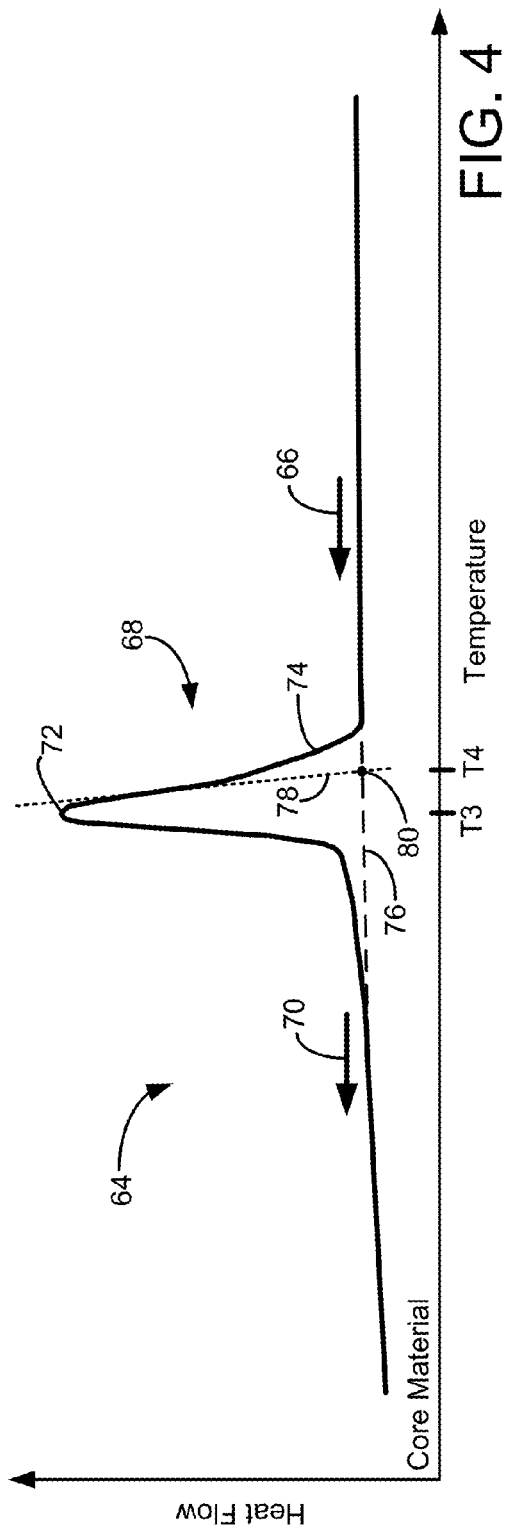

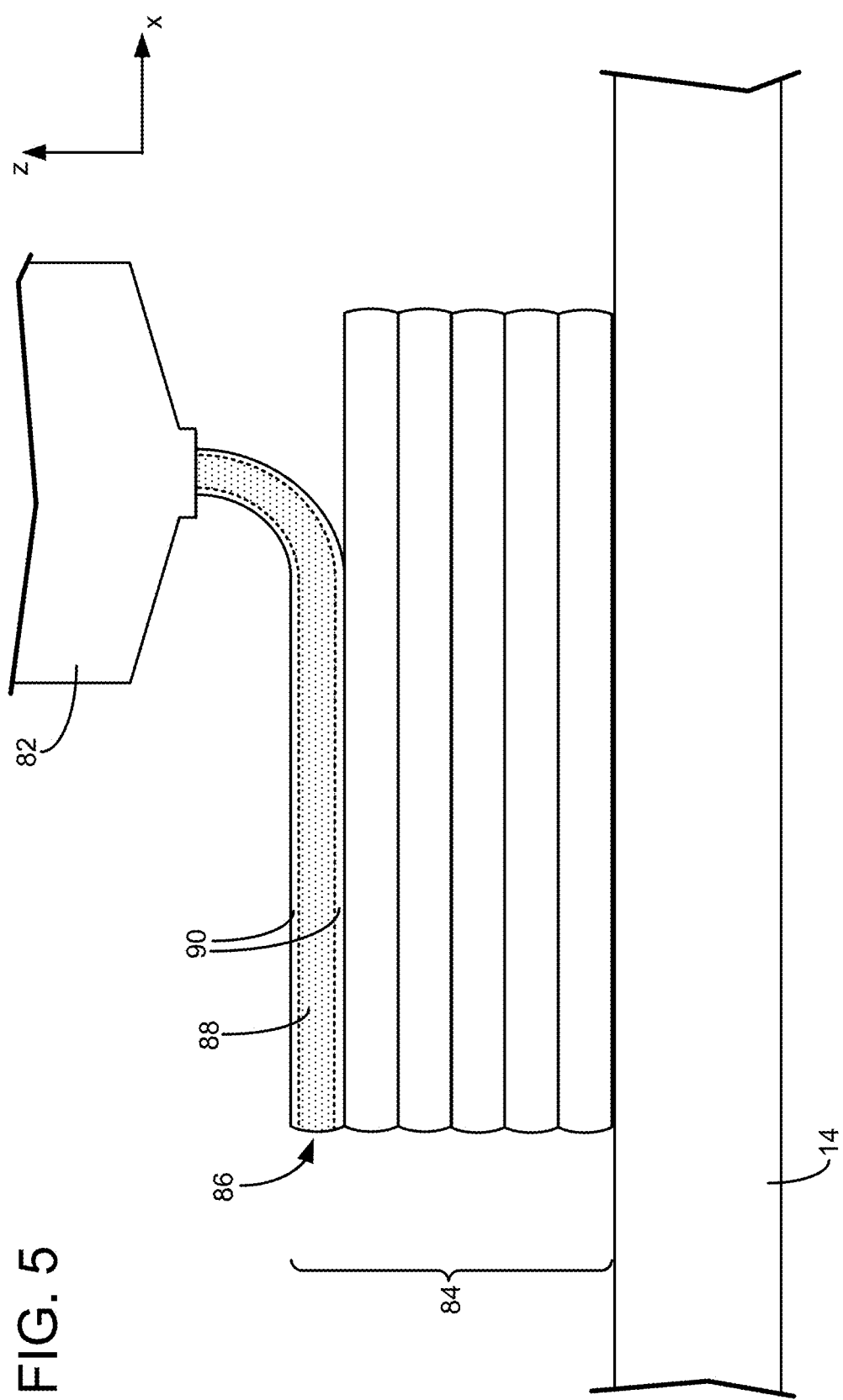

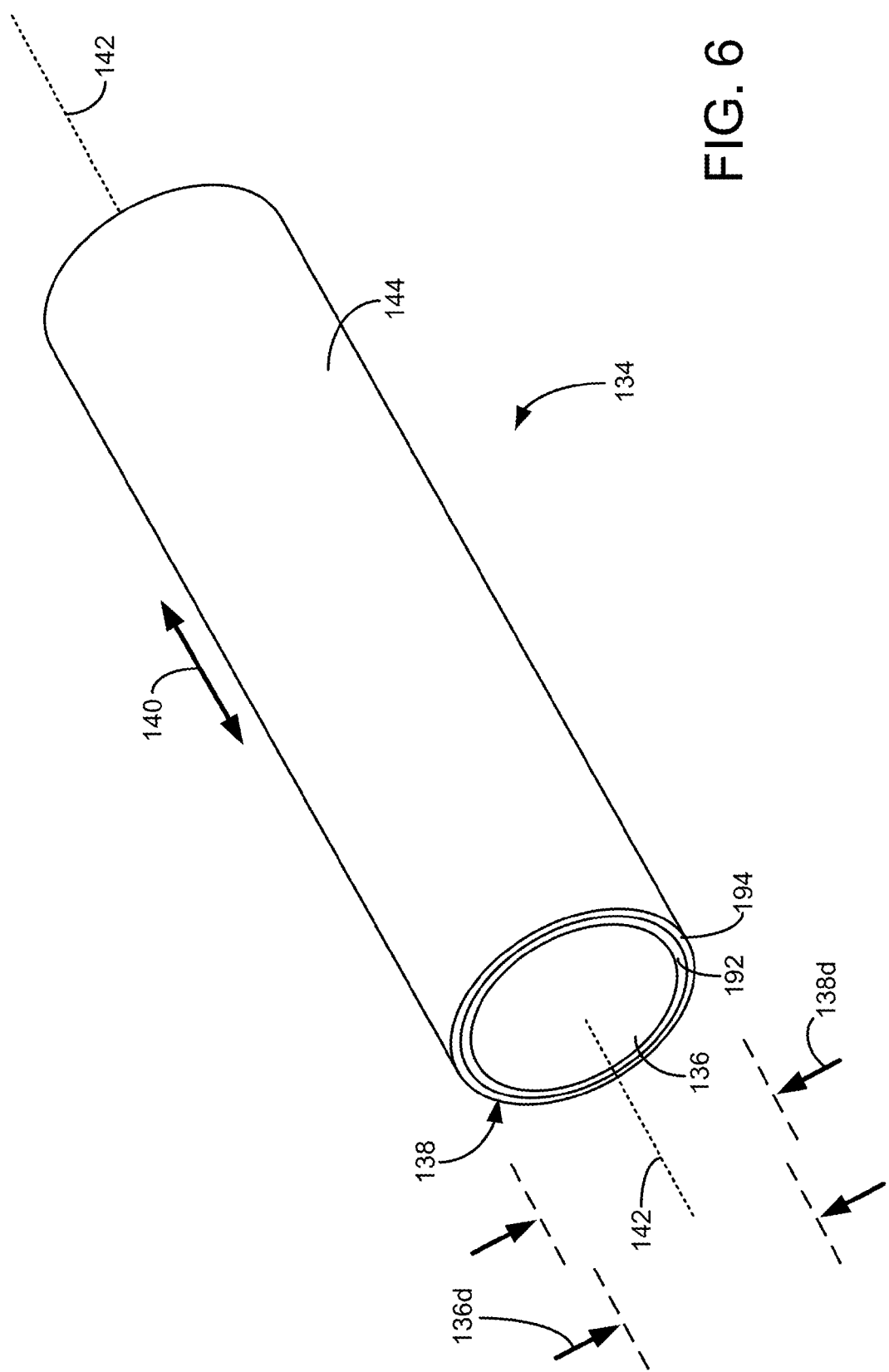

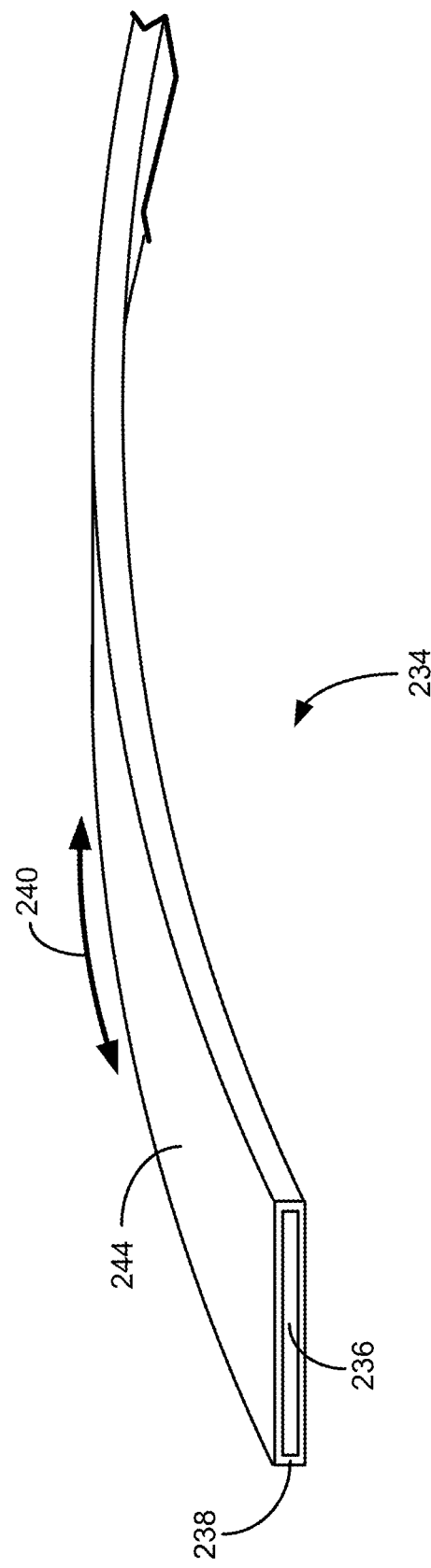

ADDITIVE MANUFACTURING METHOD FOR BUILDING THREE-DIMENSIONAL OBJECTS WITH CORE-SHELL ARRANGEMENTS, AND THREE-DIMENSIONAL OBJECTS THEREOF

CROSS-REFERENCE TO RELATED APPLICATION(S)

This application is a divisional application of U.S. patent application Ser. No. 13/855,945, filed on Apr. 3, 2013, which is a divisional of U.S. patent application Ser. No. 13/419,669, filed on Mar. 14, 2012, and also published as U.S. Pat. No. 8,920,697, and entitled "Core-Shell Consumable Materials For Use In Extrusion-Based Additive Manufacturing Systems"; which is a continuation-in-part of U.S. patent application Ser. No. 13/233,280, filed on Sep. 15, 2011, and also published as U.S. Pat. No. 8,801,990, and entitled "Semi-Crystalline Consumable Materials For Use In Extrusion-Based Additive Manufacturing Systems; which claims priority to U.S. Provisional Patent Application No. 61/383,844, filed on Sep. 17, 2010, and entitled "Semi-Crystalline Consumable Materials For Use In Extrusion-Based Additive Manufacturing Systems".

BACKGROUND

The present disclosure is directed to additive manufacturing systems for building three-dimensional (3D) models. In particular, the present disclosure relates to consumable materials for use in extrusion-based additive manufacturing systems.

An extrusion-based additive manufacturing system is used to build a 3D model from a digital representation of the 3D model in a layer-by-layer manner by extruding a flowable modeling material. The modeling material is extruded through an extrusion tip carried by an extrusion head, and is deposited as a sequence of roads on a substrate in an x-y plane. The extruded modeling material fuses to previously deposited modeling material, and solidifies upon a drop in temperature. The position of the extrusion head relative to the substrate is then incremented along a z-axis (perpendicular to the x-y plane), and the process is then repeated to form a 3D model resembling the digital representation.

Movement of the extrusion head with respect to the substrate is performed under computer control, in accordance with build data that represents the 3D model. The build data is obtained by initially slicing the digital representation of the 3D model into multiple horizontally sliced layers. Then, for each sliced layer, the host computer generates a build path for depositing roads of modeling material to form the 3D model.

In fabricating 3D models by depositing layers of a modeling material, supporting layers or structures are typically built underneath overhanging portions or in cavities of objects under construction, which are not supported by the modeling material itself. A support structure may be built utilizing the same deposition techniques by which the modeling material is deposited. The host computer generates additional geometry acting as a support structure for the overhanging or free-space segments of the 3D model being formed. Support material is then deposited from a second nozzle pursuant to the generated geometry during the build process. The support material adheres to the modeling material during fabrication, and is removable from the completed 3D model when the build process is complete.

SUMMARY

A first aspect of the present disclosure is directed to a 3D object built with an extrusion-based additive manufacturing system. The 3D object includes a plurality of solidified layers each comprising roads formed from a flowable consumable material that exits an extrusion tip of the extrusion-based additive manufacturing system, where the flowable consumable material exiting the extrusion tip comprises a core material and a shell material that is compositionally different from the core material, and where the shell material at least partially encases the core material to provide an interface between the core material and the shell material. At least a portion of the roads of the plurality of solidified layers comprise core regions of the core material and shell regions of the shell material, where the core regions and the shell regions substantially retain cross-sectional profiles corresponding to the interface between the core material and the shell material of the flow able consumable material.

Another aspect of the present disclosure is directed to a method for building a 3D object with an additive manufacturing system having an extrusion head. The method includes extruding a flowable consumable material from an extrusion tip of the extrusion head, where the flowable consumable material comprises a core material and a shell material that is compositionally different from the core material, and where the shell material at least partially encases the core material to provide an interface between the core material and the shell material. The method also includes depositing the flowable consumable material as extruded roads that define layers of the 3D object, and solidifying the extruded roads. The solidified roads have core regions of the core material and shell regions of the shell material, where the core regions and the shell regions substantially retain cross-sectional profiles corresponding to the interface between the core material and the shell material of the flowable consumable material.

Another aspect of the present disclosure is directed to a method for building a 3D object with an additive manufacturing system having an extrusion head, which includes extruding a flowable consumable material from an extrusion tip of the extrusion head, where the flowable consumable material includes a thermoplastic core material and a shell material that is a different color from that of the thermoplastic core material, and where the shell material at least partially encases the thermoplastic core material to provide an interface between the thermoplastic core material and the shell material. The method also includes depositing the flowable consumable material as extruded roads that define layers of the 3D object, and solidifying the extruded roads, wherein the solidified roads have core regions of the thermoplastic core material and shell regions of the shell material such that exterior surfaces of the solidified roads have the color of the shell material.

Definitions

Unless otherwise specified, the following terms used in this specification have the meanings provided below.

The term "semi-crystalline polymeric material" refers to a material comprising a polymer, where the polymer is capable of exhibiting an average percent crystallinity in a solid state of at least about 10% by weight. The term "semi-crystalline polymeric material" includes polymeric materials having crystallinities up to 100% (i.e., fully-crystalline polymeric materials). For ease of discussion, the term "semi-crystalline polymeric material" is used herein since most polymeric materials have at least a small number of amorphous regions.

The terms "percent crystallinity", "peak crystallization temperature", "slope-intercept crystallization temperature", "peak melting temperature", and "slope-intercept melting temperature" are defined below in the specification with reference to differential scanning calorimetry (DSC) plots and ASTM D3418-08.

The terms "core portion" and "shell portion" of a filament refer to relative locations of the portions along a cross-section of the filament that is orthogonal to a longitudinal length of the filament, where the core portion is an inner portion relative to the shell portion. Unless otherwise stated, these terms are not intended to imply any further limitations on the cross-sectional characteristics of the portions.

The term "three-dimensional object" refers to any object built using a layer-based additive manufacturing technique, and includes 3D models and support structures built using layer-based additive manufacturing techniques.

The terms "about" and "substantially" are used herein with respect to measurable values and ranges due to expected variations known to those skilled in the art (e.g., limitations and variabilities in measurements).

BRIEF DESCRIPTION OF THE DRAWINGS

FIG. 3 is an illustrative differential scanning calorimetry plot of heat flow versus temperature during a cooling phase for a shell material of the shell portion.

FIG. 4 is an illustrative differential scanning calorimetry plot of heat flow versus temperature during a cooling phase for a core material of the core portion.

FIG. 5 is a side illustration of layers of a 3D model during a build operation, where the dimensions of the layers and the relative distance of an extrusion tip from the layers are exaggerated for ease of discussion.

FIG. 6 is a perspective view of a segment of an alternative consumable filament of the present disclosure, where the alternative consumable filament includes a core portion and a shell portion, where the shell portion is defined by an inner shell and outer shell.

FIG. 7 is a perspective view of a segment of a second alternative consumable filament of the present disclosure, where the second alternative consumable filament includes a rectangular cross-sectional geometry.

DETAILED DESCRIPTION

Figure 1:
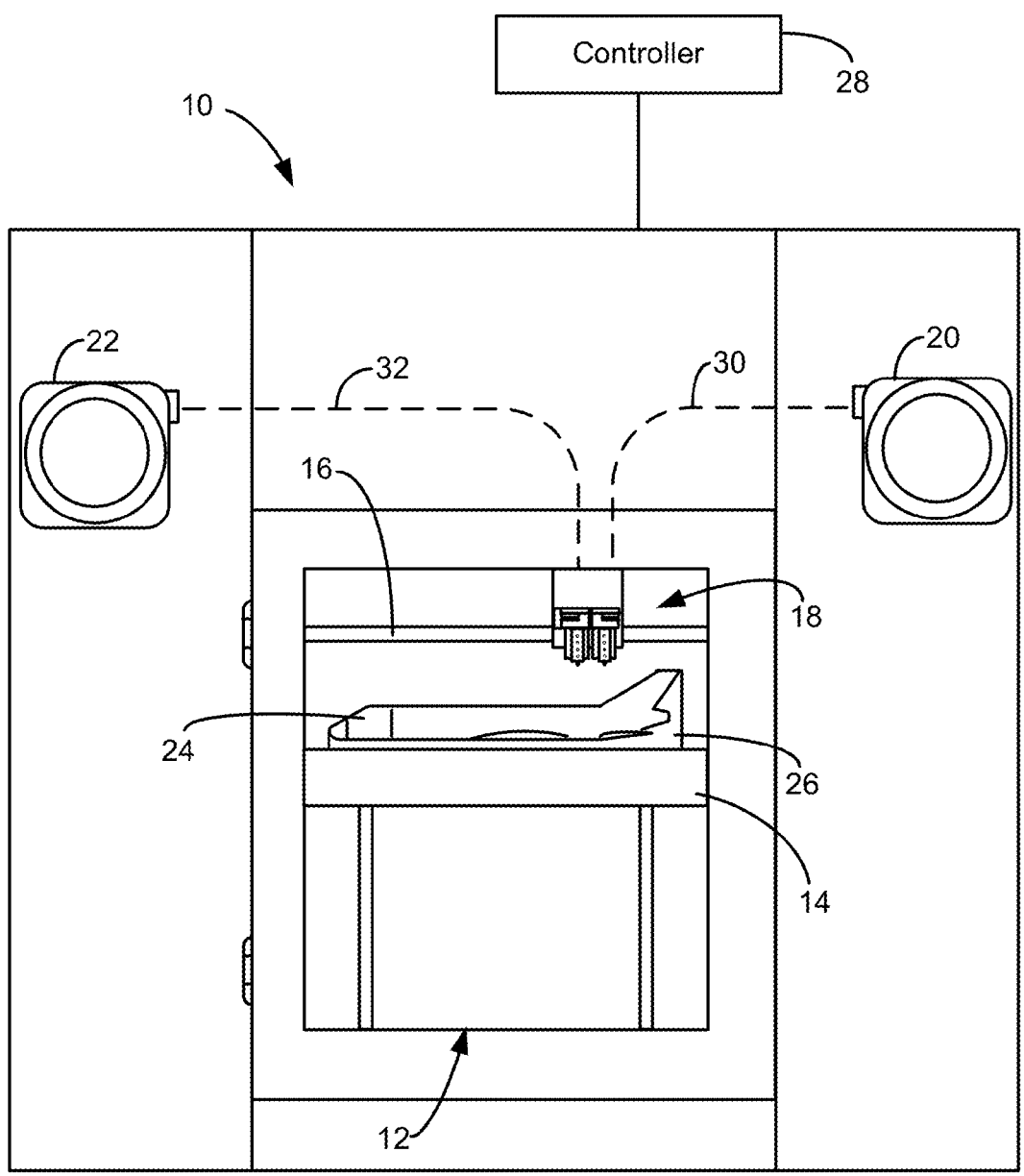
FIG. 1 is a front view of an extrusion-based additive manufacturing system for building 3D models with the use of consumable materials of the present disclosure.

The present disclosure is directed to consumable materials (e.g., consumable filaments) for use in extrusion-based additive manufacturing systems, where the consumable materials have core-shell arrangements. The core-shell arrangements include a core portion and a shell portion (or multiple core and/or shell portions), where the core portion and the shell portion compositionally include different materials that impart different properties for the consumable materials. In particular, the core portion compositionally includes a first thermoplastic material and the shell portion compositionally includes a second thermoplastic material that is different from the first thermoplastic material. As discussed below, the different properties from these materials may assist in the build operations in the extrusion-based additive manufacturing systems.

FIGS. 1-7 illustrate a first embodiment of the consumable materials of the present disclosure. In this embodiment, the consumable materials compositionally include multiple semi-crystalline polymeric materials having different crystallization temperatures. As discussed below, this difference in crystallization temperatures desirably reduces distortions, internal stresses, and sagging of the semi-crystalline polymeric materials when deposited as extruded roads to form layers of 3D models. The resulting 3D models may accordingly be built with reduced levels of curling and distortion, with good dimensional accuracies, and with good interlayer z-bond strengths.

Extrusion-based additive manufacturing systems currently build 3D models with the use of amorphous polymeric materials, such as acrylonitrile-butadiene-styrene (ABS) resins and polycarbonate resins. Amorphous polymeric materials have little or no ordered arrangements of their polymer chains in their solid states. As such, these materials exhibit glass transition effects that render them suitable for building 3D models and support structures in extrusion-based additive manufacturing systems. For example, as disclosed in Batchelder, U.S. Pat. No. 5,866,058, an amorphous polymeric material may be deposited into a build region maintained at a temperature that is between a solidification temperature and a glass transition temperature of the material. This reduces the effects of curling and plastic deformation in the resulting 3D model or support structure.

Semi-crystalline polymeric materials, however, have different mechanical and thermal characteristics from amorphous polymeric materials. For example, due to their crystallinity, 3D models built with semi-crystalline polymeric materials may exhibit superior mechanical properties compared to 3D models built with amorphous polymeric materials. However, due to their higher levels of crystallinity, semi-crystalline polymeric materials exhibit discontinuous changes in volume upon solidification. Therefore, when supplied as a monofilament, a semi-crystalline polymeric material may contract and shrink when deposited to form a 3D model in an extrusion-based additive manufacturing system. This is particularly true for materials that are highly crystalline in their solid states.

This shrinkage initially occurs when an extruded road is deposited to form a portion of a layer of a 3D model. Additional shrinkage also occurs upon further cooling of the 3D model. These shrinkages can cause cumulative distortions, internal stresses, and curling of the 3D model being fabricated. For amorphous polymeric materials, curling and distortion can be reduced by elevating the temperature in the build region. However, for semi-crystalline polymeric materials, which exhibit discontinuous changes in volume upon solidification, the elevated temperature required to reduce distortions results in sagging of the extruded roads, which may also result in distortions of the 3D model being built.

Accordingly, in one embodiment, the consumable materials of the present disclosure include a consumable, semi-crystalline filament having a first or core portion and a second or shell portion, where the first and second portions are derived from semi-crystalline polymeric materials having different crystallization temperatures. As discussed below, this difference in crystallization temperatures allows the material of the second portion to crystallize upon deposition, while the material of the first portion crystallizes upon further cooling. This desirably reduces distortions, internal stresses, and sagging of the semi-crystalline polymeric materials when deposited as extruded roads to form layers of 3D models.

As shown in FIG. 1, system 10 is an extrusion-based additive manufacturing system for building 3D models with a semi-crystalline filament. As such, the resulting 3D models may be built with semi-crystalline polymeric materials, while exhibiting reduced distortions. Examples of suitable systems for system 10 include extrusion-based additive manufacturing systems, such as those commercially available from Stratasys, Inc., Eden Prairie, Minn. under the trade designations "FUSED DEPOSITION MODELING" and "FDM".

System 10 includes build chamber 12, platen 14, gantry 16, extrusion head 18, and supply sources 20 and 22. Build chamber 12 is an enclosed, heatable environment that contains platen 14, gantry 16, and extrusion head 18 for building a 3D model (referred to as 3D model 24) and a corresponding support structure (referred to as support structure 26). Platen 14 is a platform on which 3D model 24 and support structure 26 are built, and desirably moves along a vertical z-axis based on signals provided from computer-operated controller 28. Platen 14 may also include a polymeric film (not shown) to further facilitate the removal of 3D model 24 and support structure 26.

Gantry 16 is a guide rail system that is desirably configured to move extrusion head 18 in a horizontal x-y plane within build chamber 12 based on signals provided from controller 28. The horizontal x-y plane is a plane defined by an x-axis and a y-axis (not shown), where the x-axis, the y-axis, and the z-axis are orthogonal to each other. In an alternative embodiment, platen 14 may be configured to move in the horizontal x-y plane within build chamber 12, and extrusion head 18 may be configured to move along the z-axis. Other similar arrangements may also be used such that one or both of platen 14 and extrusion head 18 are moveable relative to each other.

Extrusion head 18 is supported by gantry 16 for building 3D model 24 and support structure 26 on platen 14 in a layer-by-layer manner, based on signals provided from controller 28. In the embodiment shown in FIG. 1, extrusion head 18 is a dual-tip extrusion head configured to deposit materials from supply source 20 and supply source 22, respectively. Examples of suitable extrusion heads for extrusion head 18 include those disclosed in Crump et al., U.S. Pat. No. 5,503,785; Swanson et al., U.S. Pat. No. 6,004,124; LaBossiere, et al., U.S. Pat. No. 7,604,470; and Leavitt, U.S. Pat. No. 7,625,200. Furthermore, system 10 may include a plurality of extrusion heads 18 for depositing modeling and/or support materials.

The semi-crystalline filament may be used as the modeling material for building 3D model 24. As such, the semi-crystalline filament may be supplied to extrusion head 18 from supply source 20 via feed line 30, thereby allowing extrusion head 18 to melt and deposit the semi-crystalline polymeric materials as a series of extruded roads to build 3D model 24 in a layer-by-layer manner. Correspondingly, the support material may be supplied to extrusion head 18 from supply source 22 via feed line 32, thereby allowing extrusion head 18 to melt and deposit the support material as a series of extruded roads to build support structure 26 in a layer-by-layer manner. Suitable devices for supply sources 20 and 22 include those disclosed in Swanson et al., U.S. Pat. No. 6,923,634; Comb et al., U.S. Pat. No. 7,122,246; and Taatjes et al, U.S. Patent Application Publication Nos. 2010/0096485 and 2010/0096489.

In one embodiment, the support material used to build support structure 26 may be an amorphous polymeric material, such as the water-soluble and break-away support materials commercially available from Stratasys, Inc., Eden Prairie, Minn. In an alternative embodiment, a semi-crystalline filament of the present disclosure may also be used as the support material for building support structure 26. As such, in this alternative embodiment, support structure 26 may also be built using semi-crystalline polymeric materials.

During a build operation, gantry 16 moves extrusion head 18 around in the horizontal x-y plane within build chamber 12, and one or more drive mechanisms are directed to intermittently feed the modeling and support materials through extrusion head 18 from supply sources 20 and 22. Examples of suitable drive mechanisms for use in extrusion head 18 include those disclosed in Crump et al., U.S. Pat. No. 5,503,785; Swanson et al., U.S. Pat. No. 6,004,124; LaBossiere, et al., U.S. Pat. Nos. 7,384,255 and 7,604,470; Leavitt, U.S. Pat. No. 7,625,200; and Batchelder et al., U.S. Patent Application Publication No. 2009/0274540.

The received modeling and support materials are then deposited onto platen 14 to build 3D model 24 and support structure 26 as extruded roads using a layer-based additive manufacturing technique. Build chamber 12 is desirably heated to one or more suitable temperatures to allow the extruded roads of 3D model 24 to crystallize in two stages. In particular, the temperature(s) of build chamber 12 desirably allow the semi-crystalline polymeric material of the second or shell portion to crystallize upon deposition, while the semi-crystalline polymeric material of the first or core portion desirably crystallizes upon further cooling. This allows the extruded roads to resist gravity and the pressures of subsequent layers, while also reducing distortions of 3D model 24.

Support structure 26 is desirably deposited to provide vertical support along the z-axis for overhanging regions of the layers of 3D model 24. This allows 3D object 24 to be built with a variety of geometries. After the build operation is complete, the resulting 3D model 24/support structure 26 may be removed from build chamber 12. Support structure 26 may then be removed from 3D model 24. For example, in embodiments in which the support material is water soluble, the resulting 3D model 24/support structure 26 may be placed in a bath containing an aqueous liquid and/or solution (e.g., an aqueous alkaline solution) to remove support structure 26 from 3D model 24.

Figure 2:
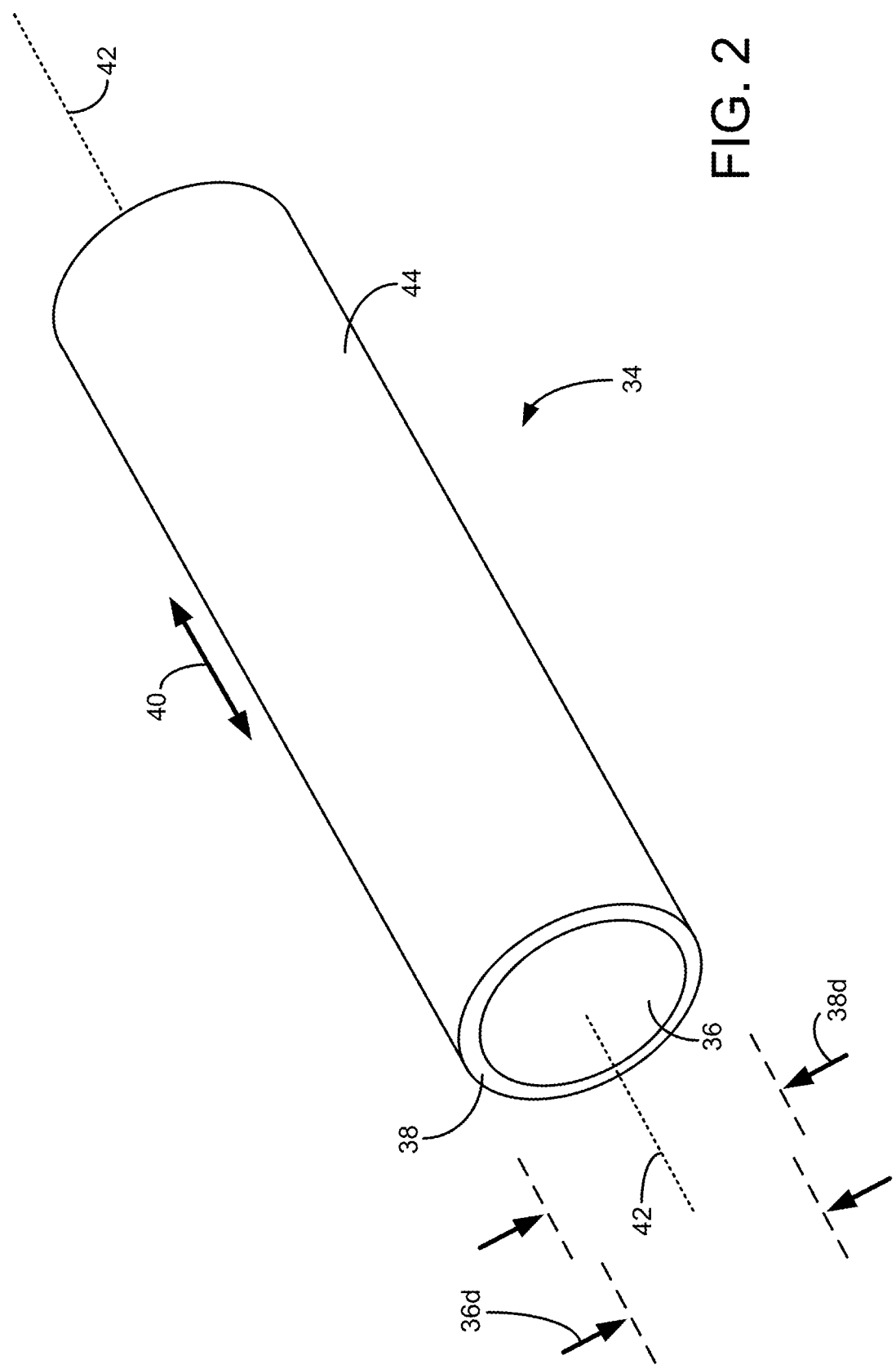
FIG. 2 is a perspective view of a segment of a consumable filament of the present disclosure, where the consumable filament includes a core portion and a shell portion.

FIG. 2 illustrates a segment of filament 34, which is an example of a suitable consumable, semi-crystalline filament of the present disclosure. As shown, filament 34 includes core portion 36 and shell portion 38, which extend along longitudinal length 40. Core portion 36 is the inner portion of filament 34, located around central axis 42, and shell portion 38 is the outer portion of filament 34, located adjacent to outer surface 44. Core portion 36 compositionally includes a first semi-crystalline polymeric material, referred to as a core material. Shell portion 38 compositionally includes a second semi-crystalline polymeric material, referred to as a shell material, where the shell material has a higher crystallization temperature than the core material.

The core and shell materials each include one or more base polymers and, optionally, one or more additives to modify the crystallization temperatures of the base polymers. Examples of suitable base polymers for use in each of the core and shell materials include polyamides, polyethylenes, polypropylenes, polyetheretherketones, polyetherarylketones, perfluoroalkoxys, polychlorotrifluoroethylenes, polyphenylene sulfides, fluorinated ethylene propylenes, polytetrafluoroethylenes, ethylene-tetrafluoroethylenes, polyvinylidene fluorides, and ethylene-chlorortifluoroethylenes, copolymers thereof, and combinations thereof. Suitable polyamides include aliphatic nylon polyamides, such as nylon 6, nylon 6-6, nylon 6-10, nylon 6-12, nylon 10, nylon 10-10, nylon 11, nylon 12, and combinations thereof. Suitable polyethylenes include low-density polyethylene, medium-density polyethylene, high-density polyethylene, and combinations thereof. Suitable polypropylenes include isotactic polypropylenes, syndiotactic polypropylenes, branched and linear variations thereof, and combinations thereof. Unless indicated otherwise, the base polymers for the core and shell materials are not intended to be limited to these listed polymers.

As defined above, the base polymers for the core and shell materials are each capable of achieving an average percent crystallinity in a solid state of at least about 10% by weight. In one embodiment, the base polymer(s) for the core material and/or the shell material is capable of achieving an average percent crystallinity in a solid state of at least about 25% by weight. In another embodiment, the base polymer(s) for the core material and/or the shell material is capable of achieving an average percent crystallinity in a solid state of at least about 50% by weight. The term "percent crystallinity" is defined below with reference to a differential scanning calorimetry (DSC) plot and ASTM D3418-08.

The difference in crystallization temperatures between the core and shell materials may be attained with a variety of different material combinations. In one embodiment, the core and shell materials include different base polymers to attain different crystallization temperatures. For example, core portion 36 may be derived from polyethylene, and shell portion 38 maybe derived from an isotactic polypropylene having a crystallization temperature greater than that of the polyethylene of core portion 36.

In another embodiment, the core and shell materials may include base polymers derived from the same or similar monomer units, but have different molecular properties to produce different crystallization temperatures, such as different relative molar masses, different molecular weights, different terminal group chemistries, different stereochemistries, and combinations thereof. For example, core portion 36 may be derived from a highly-branched isotactic polypropylene, and shell portion 38 maybe derived from a linear isotactic polypropylene.

In yet another embodiment, the core and shell materials may include the same or similar base polymers, where the core material also includes one or more additives to decrease its crystallization temperature. For example, the shell material may include a base polymer (e.g., nylon-12 polyamide), and the core material may include the same or similar base polymer (e.g., nylon-12 polyamide) and one or more crystallization inhibitors to decrease the crystallization temperature of the core material relative to the shell material.

Crystallization inhibitors may slow down the crystal growth of the base polymer in the core material by blocking growth sites on the crystal surfaces. Examples of suitable crystallization inhibitors for use in the core material include polyether block amide (PEBA) copolymers, and the like. The crystallization inhibitors may be blended with the base polymer and/or incorporated in the backbone of the base polymer.

Examples of suitable concentrations of crystallization inhibitors in the core material range from about 0.1% by weight to about 20% by weight. In one embodiment, suitable concentrations of crystallization inhibitors in the core material range from about 0.5% by weight to about 15% by weight. In yet another embodiment, suitable concentrations of crystallization inhibitors in the core material range from about 1% by weight to about 10% by weight.

In an additional embodiment, the core and shell materials may include the same or similar base polymers, where the shell material also includes one or more additives to increase its crystallization temperature. For example, the core material may include a base polymer (e.g., nylon-12 polyamide), and the shell material may include the same or similar base polymer (e.g., nylon-12 polyamide) and one or more nucleating agents to increase the crystallization temperature of the shell material relative to the core material.

The nucleating agents may increase the nucleation rate of the base polymer in the shell material, thereby providing higher crystallinity and smaller crystals. This may also render the shell material more transparent to visible light. As such, in some embodiments, the nucleating agents may also function as clarifying agents. Examples of suitable nucleating agents for use in the shell material include silica (e.g., fumed silica), alumnina (e.g., fumed alumina), molybdenum disulfide, sodium benzoate, talk, graphite, calcium fluoride, clay, sodium phenylphosphinate, zinc phenylphosphinate, sorbitol-based agents, and combinations thereof.

Example of suitable sorbitol-based agents include those commercially available under the trade designation "MILLARD" from Milliken & Company, Spartanburg, S.C., such as "MILLARD 3988" nucleating agent. Additional examples of suitable sorbitol-based agents include those commercially available under the trade designation "IRGACLEAR" from Ciba Specialty Chemicals, Basel, Switzerland (subsidiary of BASF SE, Ludwigshafen, Germany), such as "IRGACLEAR XT 386" nucleating agent.

Examples of suitable concentrations of the nucleating agents in the shell material of shell portion 38 range from about 0.01% by weight to about 20% by weight. In one embodiment, suitable concentrations of the nucleating agents in the shell material range from about 1% by weight to about 10% by weight. In yet another embodiment, suitable concentrations of the nucleating agents in the shell material range from about 1% by weight to about 5% by weight.

It some embodiments, the base polymer of the core material may be polymerized in a manner such that the core material is free or substantially free of impurities that promote crystallization. For example, the core material is desirably free or substantially free of polymerization catalysts or particulate additives that may promote crystallization, such as providing a polyamide that has been polymerized as an uncatalyzed hydrolytically-polymerized material.

The above-discussed material combinations for the core and shell materials may also be further combined together. For example, the core and shell materials may include the same or similar base polymers, where the core material includes one or more additives to decrease its crystallization temperature, and where the shell material includes one or more additives to increase its crystallization temperature. Accordingly, the core and shell materials may include a variety of compositional combinations to attain a desired difference in crystallization temperatures.

In the shown embodiment, filament 34 has a cylindrical geometry. Core portion 36 has an outer diameter referred to as core diameter 36d, and shell portion 38 has an outer diameter referred to as shell diameter 38d, where shell diameter 38d also corresponds to the outer diameter of filament 34. The relative dimensions for shell diameter 38d to core diameter 36d are desirably selected such that the amount of the shell material that is extruded falls within a balanced range for use in system 10 (shown in FIG. 1).

The amount of the shell material in filament 34 is desirably high enough such that the extruded roads used to build each layer of 3D model 24 (shown in FIG. 1) have sufficient quantities of the shell material (which crystallizes upon deposition in build chamber 12) to resist gravity and the pressures exerted on the extruded roads during the formation of subsequent layers of 3D model 24. On the other end, the amount of the shell material is desirably low enough to prevent substantial distortions of 3D model 24 upon deposition. The amount of the shell material in filament 34 may be determined by dividing the average volume of shell portion 38 from the overall average volume of filament 34 (i.e., the sum of the average volumes of core portion 36 and shell portion 38). The average diameters, cross-sectional areas, and volumes referred to herein are based on average measurements taken for a suitable segment of filament 34 along longitudinal length 40, such as a distance of 6.1 meters (20 feet).

In embodiments in which core diameter 36d and shell diameter 38d are each substantially uniform along longitudinal length 40, measurements of the volumes of shell portion 38 and filament 34 may be simplified to functions of the respective cross-sectional areas. For cylindrical filament 34, the cross-sectional areas for core portion 36, shell portion 38, and filament 34 may be determined based on core diameter 36d and shell diameter 38d.

Examples of suitable average diameters for core diameter 36d range from about 0.76 millimeters (about 0.03 inches) to about 2.5 millimeters (about 0.10 inches). In one embodiment, suitable average diameters for core diameter 36d range from about 1.0 millimeter (about 0.04 inches) to about 1.5 millimeters (about 0.06 inches). Examples of suitable average diameters for shell diameter 38d range from about 1.0 millimeter (about 0.04 inches) to about 3.0 millimeters (about 0.12 inches). In one embodiment, suitable average diameters for shell diameter 38d range from about 1.0 millimeter (about 0.04 inches) to about 1.5 millimeters (about 0.06 inches). In another embodiment, suitable average diameters for shell diameter 38d range from about 1.5 millimeters (about 0.06 inches) to about 2.0 millimeters (about 0.08 inches).

Correspondingly, examples of suitable average cross-sectional areas for core portion 36 range from about 0.5 square millimeters to about 5 square millimeters. In one embodiment, suitable average cross-sectional areas for core portion 36 range from about 0.75 square millimeters to about 2 square millimeters. Examples of suitable average cross-sectional areas for filament 34 range from about 0.5 square millimeters to about 8 square millimeters. In one embodiment, suitable average cross-sectional areas for filament 34 range from about 1 square millimeter to about 3 square millimeters. In another embodiment, suitable average cross-sectional areas for filament 34 range from about 1 square millimeter to about 2 square millimeters. In yet another embodiment, suitable average cross-sectional areas for filament 34 range from about 2 square millimeters to about 3 square millimeters.

The use of cross-sectional areas is also suitable for determining the cross-sectional dimensions of semi-crystalline filaments of the preset disclosure that have non-cylindrical geometries (e.g., oval, rectangular, triangular, star-shaped, and the like), as discussed below. For example, suitable average cross-sectional areas for the core portion of a non-cylindrical consumable filament of the present disclosure range from about 0.25 square millimeters to about 0.75 square millimeters. Correspondingly, examples of suitable average cross-sectional areas for the non-cylindrical consumable filament range from about 0.5 square millimeters to about 1.5 square millimeters.

Suitable volumes and cross-sectional areas for shell portion 38 may be determined based on these above-discussed suitable cross-sectional areas. Examples of suitable average volumes for shell portion 38 range from about 5% to about 75% of the average volume of filament 34. In one embodiment, suitable average volumes for shell portion 38 range from about 15% to about 65% of the average volume of filament 34. In another embodiment, suitable average volumes for shell portion 38 range from about 25% to about 55% of the average volume of filament 34.

Correspondingly, in embodiments in which core portion 36 and shell portion 38 are each substantially uniform along longitudinal length 40, examples of suitable average cross-sectional areas for shell portion 38 range from about 5% to about 75% of the average cross-sectional area of filament 34. In one embodiment, suitable average cross-sectional areas for shell portion 38 range from about 15% to about 65% of the average cross-sectional area of filament 34. In another embodiment, suitable average cross-sectional areas for shell portion 38 range from about 25% to about 55% of the average cross-sectional area of filament 34.

As further shown in FIG. 2, shell portion 38 extends entirely around core portion 36 along longitudinal length 40. In alternative embodiments, shell portion 38 may extend only partially around core portion 36, such as with a "C" shaped arrangement. In additional alternative embodiments, shell portion 38 may extend partially or fully around core portion 36 in non-contiguous segments along longitudinal length 40. These alternative embodiments are suitable for modifying the feed mechanics of filament 34 through system 10, and for attaining desired volume fractions of the shell material.

Filament 34 may be manufactured with a co-extrusion process, where the core and shell materials may be separately compounded and co-extruded to form filament 34. While core portion 36 and shell portion 38 are illustrated in FIG. 2 as having a defined interface, it is understood that the core and shell materials may at least partially interdiffuse at this interface due to the co-extrusion process. After formation, filament 34 may be wound onto a spool or be otherwise packaged for use with system 10 (e.g., within supply source 20).

While the consumable, semi-crystalline filaments of the present disclosure are discussed herein as having a core portion and one or more shell portions, the semi-crystalline filaments of the present disclosure may alternatively include different arrangements of the multiple semi-crystalline polymeric materials, such that each semi-crystalline filament includes a first portion that compositionally includes a first semi-crystalline polymeric material, and a second portion that compositionally includes a second semi-crystalline polymeric material having a higher crystallization temperature than the first semi-crystalline polymeric material.

For example, in one embodiment, the semi-crystalline filament may be manufactured to provide a gradual or step-wise gradient of the semi-crystalline filament materials between a central axis and an outer surface. In this embodiment, the semi-crystalline filament materials may be highly interdiffused to provide a gradual interface between a first portion (e.g., a core portion) and second portion (e.g., a shell portion). At the central axis, the composition of the semi-crystalline filament desirably includes a first semi-crystalline polymeric material (e.g., a core material), and at the outer surface, the composition of the semi-crystalline filament desirably includes only a second semi-crystalline polymeric material (e.g., a shell material). Inbetween the central axis and the outer surface, the concentration of the second semi-crystalline polymeric material may gradually increase in an outward direction from the central axis to the outer surface.

FIGS. 3 and 4 respectively illustrate DSC plots of heat flow versus temperature during cooling stages for the shell and core materials of filament 34. As discussed above, the shell material of shell portion 38 has a higher crystallization temperature than the core material of core portion 36. DSC provides a suitable technique for measuring the percent crystallinities, the crystallization temperatures, and the melting temperatures for the core and shell materials, where the DSC plots referred to herein are measured pursuant to ASTM D3418-08.

As shown in FIG. 3, after being heated beyond its melting temperature and allowed to cool, the shell material of shell portion 38 generates DSC plot 46. In particular, as the measured temperature drops, as indicated by arrow 48, the heat flow remains substantially constant until the crystallization onset temperature of the shell material is reached. At this point, the shell material crystallizes and releases heat, as indicated by exothermic crystallization peak 50. After crystallizing, the shell material then cools down further, as indicated by arrow 52.

Peak 50 may be used to determine the crystallization temperature of the shell material, where the crystallization temperature of the shell material may be identified by a peak crystallization temperature or a slope-intercept crystallization temperature. As used herein, the term "peak crystallization temperature" refers to a temperature corresponding to a peak point of an exothermic crystallization peak on a DSC plot, and corresponds to the maximum rate of crystallization for the shell material. For example, as shown in FIG. 3, peak 50 has a peak point 54 at temperature T1. Thus, temperature T1 is the peak crystallization temperature for the shell material of shell portion 38.

As used herein, the term "slope-intercept crystallization temperature" refers to a temperature corresponding to a point at which the slope of the rising curve of an exothermic crystallization peak on a DSC plot intersects with a baseline of the exothermic crystallization peak. The rising curve of an exothermic crystallization peak is based on the measured heat flow as the material begins to crystallize from the molten state. For example, as shown in FIG. 3, peak 50 for the shell material includes rising curve 56 and baseline 58, where rising curve 56 has a slope defined by line 60. Line 60 intersects baseline 58 at intersection point 62, which is located at temperature T2. Thus, temperature T2 is the slope-intercept crystallization temperature for the shell material of shell portion 38.

Correspondingly, as shown in FIG. 4, after being heated beyond its melting temperature and allowed to cool, the core material of core portion 36 generates DSC plot 64. In particular, as the measured temperature drops, as indicated by arrow 66, the heat flow remains substantially constant until the crystallization onset temperature of the core material is reached. At this point, the core material crystallizes and releases heat, as indicated by exothermic crystallization peak 68. After crystallizing, the core material then cools down further, as indicated by arrow 70.

Peak 68 may be used to determine the crystallization temperature of the core material in the same manner as peak 50 for the shell material, where the crystallization temperature of the core material may also be identified by a peak crystallization temperature or a slope-intercept crystallization temperature. For example, as shown in FIG. 4, peak 68 has a peak point 72 at a temperature T3. Thus, temperature T3 is the peak crystallization temperature for the core material of core portion 36. Furthermore, peak 68 for the core material includes rising curve 74 and baseline 76, where rising curve 74 has a slope defined by line 78. Line 78 intersects baseline 76 at intersection point 80, which is located at temperature T4. Thus, temperature T4 is the slope-intercept crystallization temperature for the core material of core portion 36.

A comparison of FIGS. 3 and 4 show that as the temperatures cool down from the molten states of the materials, the shell material begins to crystallize prior to the crystallization of the core material. As such, at the crystallization temperature of the shell material (e.g., temperatures T1 and T2), the core material remains in a non-crystallized or substantially non-crystallized state until the temperature cools down to the crystallization temperature of the core material (e.g., temperatures T3 and T4). When the crystallization temperature of the core material is reached, the core material then crystallizes. This difference in crystallization temperatures desirably reduces distortions, internal stresses, and sagging of the core and shell materials when deposited as extruded roads to form layers of 3D model 24 (shown in FIG. 1).

Measurements based on peak crystallization temperatures typically provide greater differences between the crystallization temperatures of the shell and core materials compared to measurements based on slope-intercept crystallization temperatures. Examples of suitable differences in peak crystallization temperatures between the shell and core materials (e.g., between temperatures T1 and T3) include temperatures of at least about 2° C. In one embodiment, suitable differences in peak crystallization temperatures between the shell and core materials include temperatures of at least about 5° C. In another embodiment, suitable differences in peak crystallization temperatures between the shell and core materials include temperatures of at least about 10° C. In yet another embodiment, suitable differences in peak crystallization temperatures between the shell and core materials include temperatures of at least about 15° C.

Examples of suitable differences in slope-intercept crystallization temperatures between the shell and core materials (e.g., between temperatures T2 and T4) include temperatures of at least about 3° C. In one embodiment, suitable differences in slope-intercept crystallization temperatures between the shell and core materials include temperatures of at least about 5° C. In another embodiment, suitable differences in slope-intercept crystallization temperatures between the shell and core materials include temperatures of at least about 8° C.

In some embodiments, it is desirable to maintain the difference in the crystallization temperatures at an even greater difference to provide less stringent operating parameters in system 10. For example, suitable differences in peak crystallization temperatures between the shell and core materials include temperatures of at least about 20° C. In one embodiment, suitable differences in peak crystallization temperatures between the shell and core materials include temperatures of at least about 30° C. In another embodiment, suitable differences in peak crystallization temperatures between the shell and core materials include temperatures of at least about 40° C.

In other embodiments, it is desirable to maintain the difference in the crystallization temperatures below an upper threshold. Accordingly, examples of suitable differences in peak crystallization temperatures between the shell and core materials also include temperatures less than about 25° C. In one embodiment, suitable differences in peak crystallization temperatures between the shell and core materials include temperatures less than about 20° C. Correspondingly, examples of suitable differences in slope-intercept crystallization temperatures between the shell and core materials also include temperatures less than about 20° C. In one embodiment, suitable differences in slope-intercept crystallization temperatures between the shell and core materials include temperatures less than about 15° C.

The DSC plots may also be used to determine the percent crystallinity of the shell and core materials, which is known to those skilled in the art. For example, peak 50 (shown in FIG. 3) maybe used to determine the enthalpy of fusion for base polymer of the shell material. The enthalpy of fusion for the base polymer of the shell material may then be normalized to the enthalpy of fusion of a 100% crystalline polymer corresponding to the base polymer of the shell material, to determine the percent crystallinity of the base polymer in shell portion 38. Similarly, peak 68 (shown in FIG. 4) maybe used to determine the enthalpy of fusion for the base polymer of the core material. The enthalpy of fusion for the base polymer of the core material may then be normalized to the enthalpy of fusion of a 100% crystalline polymer corresponding to the base polymer of the core material, to determine the percent crystallinity of the base polymer in core portion 36.

Furthermore, the melting temperatures of the core and shell materials are desirably the same or similar to allow filament 34 to be readily melted in a liquefier of extrusion head 18. As such, the core material and the shell material may be selected to minimize the differences in melting temperatures. DSC also provides a suitable technique for measuring the melting temperatures for the core and shell materials, where the melting temperatures may also be identified by peak melting temperatures or slope-intercept melting temperatures.

As used herein, the "peak melting temperature" refers to a temperature corresponding to a peak point of an endothermic melting peak on a DSC plot (not shown in FIG. 3 or 4). Correspondingly, the "slope-intercept melting temperature" refers to a temperature corresponding to a point at which the slope of the rising curve of an endothermic melting peak on a DSC plot intersects with a baseline of the endothermic melting peak. The rising curve of an endothermic melting peak is based on the measured heat flow as the material begins to melt from the solid state.

Examples of suitable differences in peak melting temperatures include temperatures of about 8° C. or less. In one embodiment, suitable differences in peak melting temperatures include temperatures of about 3° C. or less. Examples of suitable differences in slope-intercept melting temperatures include temperatures of about 10° C. or less. In one embodiment, suitable differences in slope-intercept melting temperatures include temperatures of about 5° C. or less.

FIG. 5 illustrates a build operation to build 3D model 24 (shown in FIG. 1) from the semi-crystalline polymeric materials of filament 34 (shown in FIG. 2). As discussed above, during a build operation with system 10 (shown in FIG. 1), filament 34 is fed to extrusion head 18 in a solid state from supply source 20. While passing through extrusion head 18, filament 34 is heated in a liquefier to a temperature that is greater than the melting temperatures of the shell and core materials. The molten materials are then deposited onto platen 14 from extrusion tip 82 of extrusion head 18 in a series of extruded roads to form layers 84 of 3D model 24. One or more layers of a support material (not shown) may also be deposited below layers 84 to facilitate the removal of 3D model 24 from platen 14.

In the shown example, the extruded roads of the core and shell materials may at least partially retain their core/shell cross-sectional profile from filament 34. For example, top extruded road 86 includes core region 88 of the core material and shell region 90 of the shell material, where shell region 90 may extend around and encase core region 88. In one embodiment, at least a portion of the extruded roads at least partially retain their core/shell cross-sectional profile from filament 34. In a further embodiment, substantially all of the extruded roads at least partially retain their core/shell cross-sectional profile from filament 34.

While not wishing to be bound by theory, it is believed that a substantially laminar flow of the molten core and shell materials through a liquefier of extrusion head 18 may allow the extruded roads (e.g., road 86) to at least partially retain their core/shell profile. It is understood that interdiffusion of the molten core and shell materials may occur at the interface between core region 88 and shell region 90. As such, the resulting extruded roads (e.g., road 86) may exhibit a cross-sectional profile that is the same or substantially similar to that of filament 34 (as shown in FIG. 2), may exhibit a blend of the core and shell materials, or may exhibit a cross-sectional profile that is a variation between these two profiles (e.g., a profile in which the core and shell materials are partially interdiffused).

It is understood that the extruded roads (e.g., road 86) are typically flattened during the build operation due an ironing effect from extrusion tip 82 (see e.g., FIGS. 17 and 18 below). As such, having a cross-sectional profile that is the same or substantially similar to that of the filament does not necessarily mean that the cross-sectional shapes are the same (e.g., both are circular). Rather, this phrase means that the core material remains encased (or at least partially encased) in the shell material.

As discussed above, build chamber 12 is desirably heated to one or more suitable temperatures to allow the extruded roads to crystallize in two stages. In one embodiment, the envelope of build chamber 12 may be heated and maintained at one or more temperatures that are about equal to, or within a small range above or below, the crystallization temperature of the shell material. For example, the envelope of build chamber 12 may be heated and maintained at one or more temperatures that are about equal to, or are within about 20° C. above or below, the peak crystallization temperature of the shell material, since the shell material may begin crystallizing over a temperature range around its peak crystallization temperature. In this embodiment, the temperature(s) of build chamber 12 are also desirably greater than the crystallization temperature of the core material, at least at the upper region of build chamber 12, adjacent to extrusion head 18.

Upon being deposited into build chamber 12, the molten core and shell materials of road 86 cool from the elevated liquefier temperature within extrusion head 18 to the temperature(s) of build chamber 12. This desirably cools road 86 to or below the crystallization temperature of the shell material, but above the crystallization temperature of the core material, thereby allowing the shell material to at least partially crystallize, while preventing the core material from substantially crystallizing. While not wishing to be bound by theory, it is believed that when the shell material solidifies to form shell region 90 of extruded road 86, the latent heat of transformation emitted from the shell material is at least partly absorbed by the core material, thereby reducing the rate at which core region 88 crystallizes relative to shell region 90. It is further believed that this provides good interlayer fusing, which results in good interlayer z-bond strengths (i.e., good interlayer bonds along the vertical z-axis).

The shell material of core region 90 desirably crystallizes in less time than is required to build a single layer of 3D model 24, such that the shell material exhibits at least about 30% crystallinity prior to the deposition of a subsequent layer, and more desirably at least about 50% crystallinity. In comparison, the core material of core region 88 desirably crystallizes more slowly such that shrinkage may occur after the formation of one or more subsequent layers. For example, the core material may exhibit less than about 10% crystallinity prior to the deposition of a subsequent layer, more desirably less than about 5% crystallinity.

This difference in crystallization rates within build chamber 12, due to the difference in crystallization temperatures of the core and shell materials, allows the shell material to crystallize upon deposition. This allows road 86 to resist gravity and the pressures of subsequently deposited layers. While the crystallized portions of shell region 90 contract, the non-crystallized core material of core region 88 prevents road 86 from fully contracting and distorting, which would otherwise occur with an extruded road derived from a single semi-crystalline material.

In an alternative embodiment, the envelope of build chamber 12 may be maintained at one or more temperatures that define a temperature gradient that decreases in a downward direction along the vertical z-axis. For example, the upper region of build chamber 12 may be heated and maintained at one or more temperatures that are about equal to, or within a small range above or below, the crystallization temperature of the shell material. The lower region of build chamber 12, however, may be maintained at one or more lower temperatures. For example, the lower region of build chamber 12 may be heated and maintained at one or more temperatures that are about equal to, or within a small range above or below, the crystallization temperature of the core material. As platen 14 lowers downward in an incremental manner along the vertical z-axis, the gradual or stepwise cooling may allow the core material to slowly crystallize over time as subsequent layers are built.

Instead, the above-discussed suitable volume fractions of the shell material provide a balance that allows crystallized shell region 90 to support subsequently deposited layers, while also reducing or minimizing the shrinkage of road 86. As road 86 subsequently cools down below the crystallization temperature of the core material, the core material may then gradually crystallize to fully solidify road 86. As such, this two-stage crystallization desirably reduces distortions, internal stresses, and sagging of the semi-crystalline polymeric materials when deposited as extruded roads to form the layers of 3D model 24.

In an alternative embodiment, to the core and shell materials of filament 34 may be switched such that the core material has a crystallization temperature that is greater than a crystallization temperature of the shell material. In this embodiment, upon deposition in build chamber 12, the core portion may crystallize prior to the shell portion, such as with an "islands in the sea" geometry with the islands nucleating and crystallizing prior to the crystallization of the shell material.

FIG. 6 illustrates filament 134, which is another example of a suitable consumable, semi-crystalline filament of the present disclosure. Filament 134 is similar to filament 34 (shown in FIG. 2), where the respective reference labels are increased by "100". As shown in FIG. 6, shell portion 138 of filament 134 is a multi-shell portion that includes inner shell 192 and outer shell 194. In this embodiment, inner shell 192 and outer shell 194 each desirably includes a semi-crystalline polymeric material, which provides further individual tailoring of the desired crystallization characteristics.

Suitable materials for each of inner shell 192 and outer shell 194 include those discussed above for shell portion 38 (shown in FIG. 2). For example, the semi-crystalline polymeric material of inner shell 192 may have a crystallization temperature that is between the crystallization temperatures of core portion 136 and outer shell 194. This may allow a stair-step crystallization gradient to be achieved in build chamber 12 (shown in FIG. 1). Alternatively, inner shell 192 may include a material that restricts or prevents interdiffusion and/or crystal growth between the materials of core portion 136 and outer shell 194. In this alternative embodiment, suitable materials for inner shell 192 may include one or more amorphous polymers.

Suitable dimensions for inner shell 192 and outer shell 194 may vary depending on the particular materials used. In some embodiments, the combined dimensions of inner shell 192 and outer shell 194 may include the suitable dimensions discussed above for shell portion 38. Accordingly, the consumable materials of the present disclosure may include two or more layers to attain desired crystallization growth characteristics for use in building 3D models with layer-based additive manufacturing techniques.

Additionally, the core portions of the semi-crystalline filaments may vary from the embodiments discussed above for filaments 34 and 134. For example, in some embodiments, the core portions (e.g., core portions 36 and 136) may be located off-axis from the central axis of the semi-crystalline filament. In additional alternative embodiments, the geometries of the core portions may be non-cylindrical (e.g., oval, rectangular, triangular, and the like) and/or hollow to modify the crystallization characteristics of the resulting extruded roads.

For example, as shown in FIG. 7, filament 234 is similar to filament 34 (shown in FIG. 2), where the respective reference labels are increased by "200". As shown in FIG. 7, filament 234 includes a non-cylindrical cross-sectional geometry with core portion 236 and shell portion 238 each having a rectangular cross-sectional geometry. Examples of suitable materials for core portion 236 and shell portion 238 include those discussed above for core portion 36 and shell portion 38 (shown in FIG. 2).

Suitable cross-sectional areas include those discussed above. For example, suitable average cross-sectional areas for core portion 236 range from about 0.25 square millimeters to about 0.75 square millimeters. Correspondingly, examples of suitable average cross-sectional areas for filament 234 range from about 0.5 square millimeters to about 1.5 square millimeters. In addition, the multiple-layered shell embodiment of filament 134 (shown in FIG. 6) may also be applied to filament 234 to provide a non-cylindrical, semi-crystalline filament having multiple shell layers.

Filaments 34, 134, and 234, shown above, illustrate suitable consumable materials of the present disclosure that compositionally include multiple semi-crystalline polymeric materials having different crystallization temperatures. In additional embodiments of the present disclosure, the consumable materials may compositionally include other core and shell materials that impart different properties. In these embodiments, the consumable materials may be used as modeling materials to build 3D models (e.g., 3D model 24), as support materials to build support structures (e.g., support structure 26), or both, where the different material properties may assist in the build operations with extrusion-based additive manufacturing systems, such as system 10.

Figure 8:
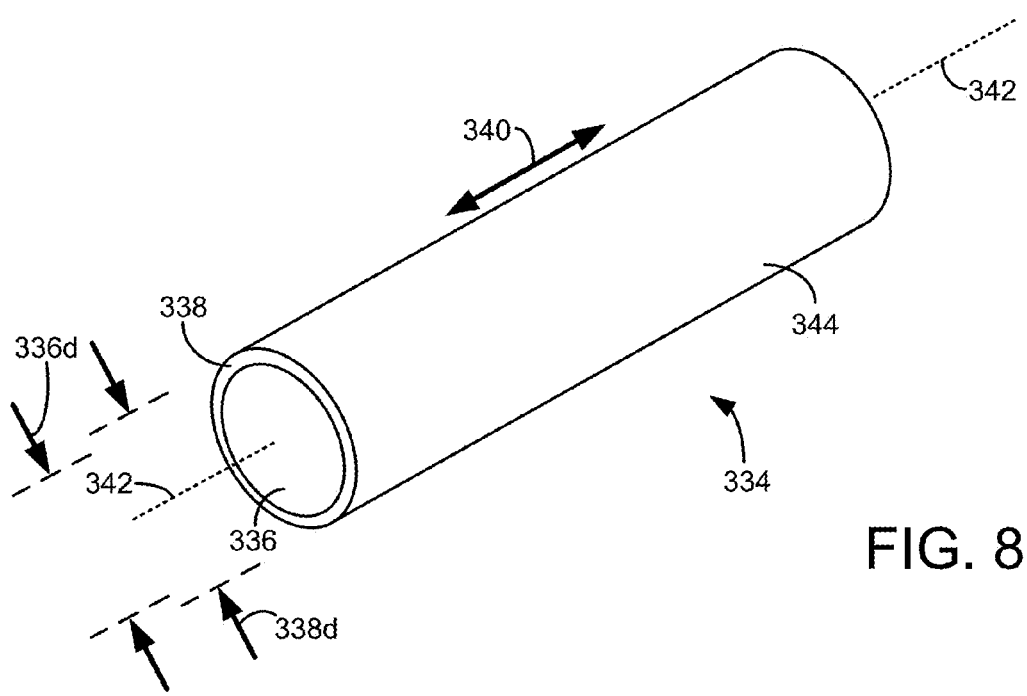
FIG. 8 is a perspective view of a segment of a third alternative consumable filament of the present disclosure.

For example, FIG. 8 illustrates filament 334, which is an example of a suitable core-shell filament of the present disclosure that is similar to filament 34 (shown in FIG. 2), and where the respective reference labels are increased by "300". In this example, core portion 336 compositionally includes a first thermoplastic material (i.e., a core material), and shell portion 338 compositionally includes a second thermoplastic material (i.e., a shell material) that is different from the first thermoplastic material. The core and shell materials for filament 334 are also applicable to filament 134 (shown in FIG. 6) and filament 234 (shown in FIG. 7).

In one embodiment, the shell material of shell portion 338 may be an amorphous or semi-crystalline thermoplastic material selected for its adhesive and removal properties, and the core material of core portion 336 may be an amorphous or semi-crystalline thermoplastic material selected for other properties, such as thermal properties, tensile strengths, flexibility, and the like. This embodiment is particularly suitable for support materials used to build support structures (e.g., support structure 26). A support material desirably has good adhesion to a respective modeling material, similar thermal properties to the modeling material, and is desirably removable after the 3D model and the support structure are built.

For example, filament 334 may be a first core-shell support material filament for use with a second core-shell modeling material filament that compositionally include multiple semi-crystalline polymeric materials having different crystallization temperatures. The shell material for shell portion 338 may be a thermoplastic material that is adhesively compatible with a desired modeling material, and that is at least partially soluble in an aqueous liquid and/or solution (e.g., an aqueous alkaline solution). Examples of suitable thermoplastic materials for shell portion 338 in this embodiment include materials commercially available under the trademarks "SR-10", "SR-20", and "SR-30" soluble support materials from Stratasys, Inc., Eden Prairie, Minn.; and those disclosed in Lombardi et al., U.S. Pat. Nos. 6,070,107 and 6,228,923; Priedeman et al., U.S. Pat. Nos. 6,790,403 and 7,754,807; and Hopkins et al., U.S. Patent Application Publication No. 2010/0096072.

Correspondingly, the core material for core portion 336 in this embodiment may be a thermoplastic material that has a higher tensile strength than the shell material. Many compositions for water-soluble support materials are relatively brittle, which can result in filament fracturing while being fed through system 10. To reduce the brittleness, the core material may be a material having a higher tensile strength, allowing filament 334 to be fed through system 10 without fracturing or breaking. This increases reliability of filament 334 in system 10.

Additionally, the core material for core portion 336 in this embodiment may also be selected for thermal compatibility with the modeling material and the operating temperature of build chamber 12. For example, the core material may be selected to have a similar creep relaxation temperature to the modeling material. Examples of suitable techniques for determining creep relaxation temperatures are disclosed in Batchelder et al., U.S. Pat. No. 5,866,058. This allows build chamber 12 to may be heated to, and maintained at, one or more temperatures that are in a window between the solidification temperature and the creep relaxation temperature of the part material and/or the support material.

Maintaining this temperature window reduces the risk of mechanically distorting (e.g., curling) the 3D models and support structures. In embodiments, in which the modeling material and the core material of core portion 336 are each amorphous thermoplastic materials, suitable creep relaxation temperatures for the core material range from within 20° C. of the creep relaxation temperature of the modeling material, more desirably within 10° C., and even more desirably within 5° C.

Figure 9:
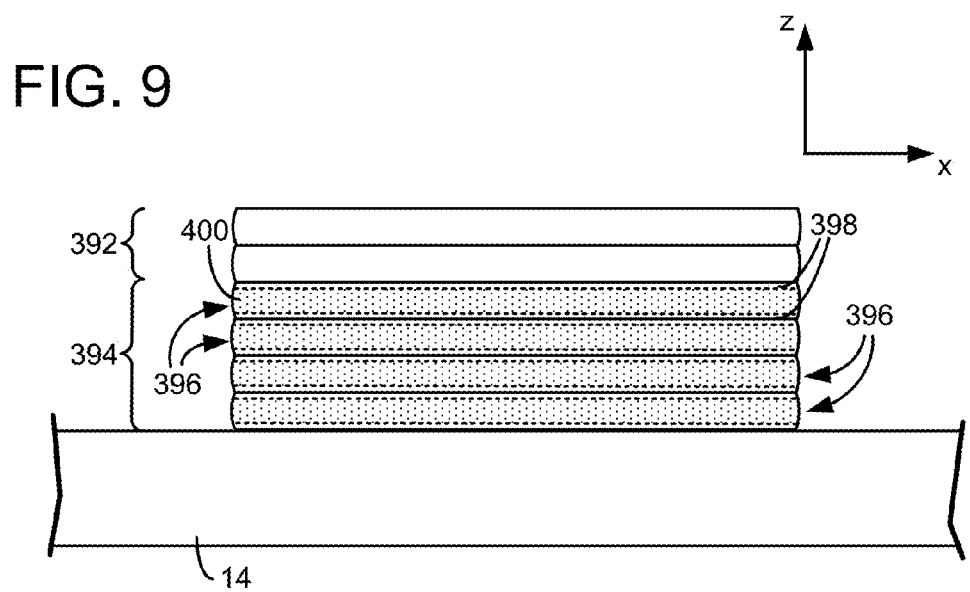
FIG. 9 is a side illustration of model layers and support layers, where the support layers are formed from the third alternative consumable filament, and where the dimensions of the layers are exaggerated for ease of discussion.

FIG. 9 illustrates modeling layers 392 of a model material and support layers 394, where support layers 394 are formed by extruded roads 396 from filament 334 (shown in FIG. 8). As discussed above for filament 34, during a build operation with system 10 (shown in FIG. 1), filament 334 may be fed to extrusion head 18 in a solid state. While passing through extrusion head 18, filament 334 is heated in a liquefier to a temperature that is greater than the melting temperatures of the shell and core materials. The molten materials are then deposited onto platen 14 from an extrusion tip of extrusion head 18 in a series of extruded roads 396 to form layers 394 of a support structure.

In the shown example, extruded roads 396 of the core and shell materials may at least partially retain their core/shell cross-sectional profile from filament 334. For example, extruded roads 396 each include core region 398 of the core material and shell regions 400 of the shell material, where shell regions 400 may extend around and encase core region 398. In one embodiment, at least a portion of the extruded roads at least partially retain their core/shell cross-sectional profile from filament 334. In a further embodiment, substantially all of the extruded roads at least partially retain their core/shell cross-sectional profile from filament 334.

The amount of the shell material in filament 334 is desirably high enough such that extruded roads 396 have sufficient quantities of the shell material to adhere to model layers 392. On the other end, the core material of core portion 336 desirably constitutes the bulk volume of filament 334. In other words, the cross-sectional area of shell portion 338 is desirably lower than the cross-sectional area of core portion 336. This allows filament 334 to have thermal properties and strengths that are similar to a filament derived entirely from the core material. Accordingly, in some embodiments, core portion 336 may be the same or substantially the same composition as the modeling material (or a core or shell portion of a modeling material filament).

Figure 10A:
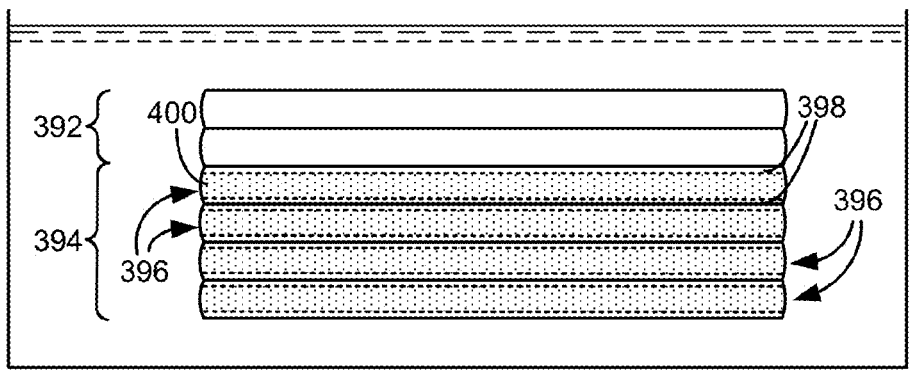
FIGS. 10A-10C are side illustrations of a technique for removing the support layers from the model layers.
Figure 10B:
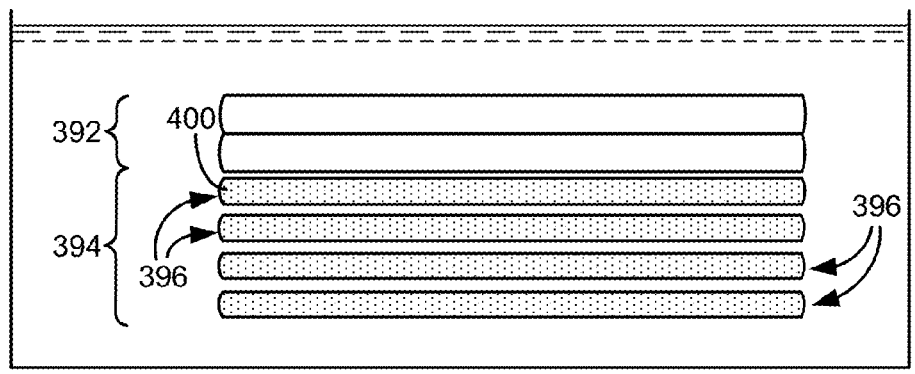
Figure 10C:
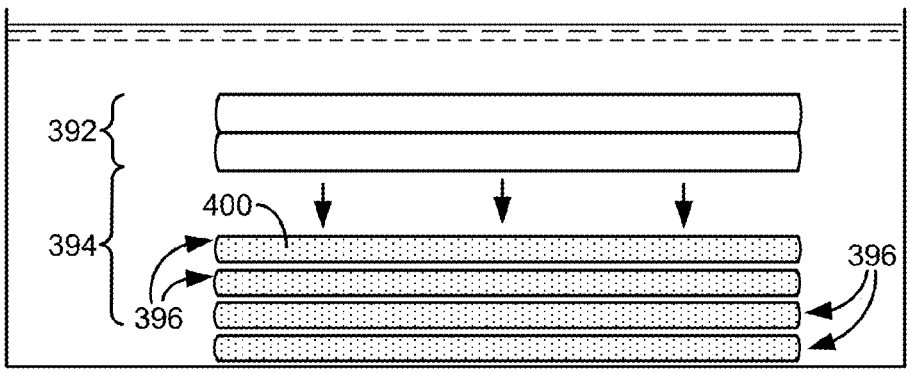

As can be appreciated, the shell material in shell region 400 adheres to the modeling material of layers 392 due to their adhesive compatibilities. Additionally, as shown in FIG. 10A, layers 394 may be removed from layers 392 by exposing layers 394 to a bath containing an aqueous liquid and/or solution (e.g., an aqueous alkaline solution). As shown in FIG. 10B, this at least partially dissolves the shell material, which removes support layers 394 from model layers 392. In embodiments in which the core material is not soluble in the bath, this results in a matrix of the core material, which effectively falls away from model layers 392, as shown in FIG. 10C.

The consumable materials of the present disclosure may include a variety of different core and shell materials. This allows the modeling materials and/or the support materials to be designed for compatibility with each other and for use in extrusion-based additive manufacturing systems, thereby increasing the range of suitable materials for building 3D models and support structures.

EXAMPLES

The present disclosure is more particularly described in the following examples that are intended as illustrations only, since numerous modifications and variations within the scope of the present disclosure will be apparent to those skilled in the art. Unless otherwise noted, all parts, percentages, and ratios reported in the following examples are on a weight basis, and all reagents used in the examples were obtained, or are available, from the chemical suppliers described below, or may be synthesized by conventional techniques.

I. Examples 1 and 2

Consumable, semi-crystalline filaments of Examples 1 and 2 were coextruded in a core and shell arrangement corresponding to filament 34 (shown in FIG. 2). The core material of the core portion included nylon-12 polyamide commercially available under the trade designation "GRILAMID L16" from EMS-Grivory, a unit of EMS-CHEMIE North America, Inc., Sumter, S.C. The shell material of the shell portion included a blend of the nylon-12 polyamide and a nucleating agent, which was commercially available under the trade designation "GRILAMID L16-LM" from EMS-Grivory, a unit of EMS-CHEMIE North America, Inc., Sumter, S.C. The nucleating agent also functioned as a clarifying agent. The shell material was also dyed with a black colorant to visibility distinguish the core portion from the shell portion.

Figure 11:
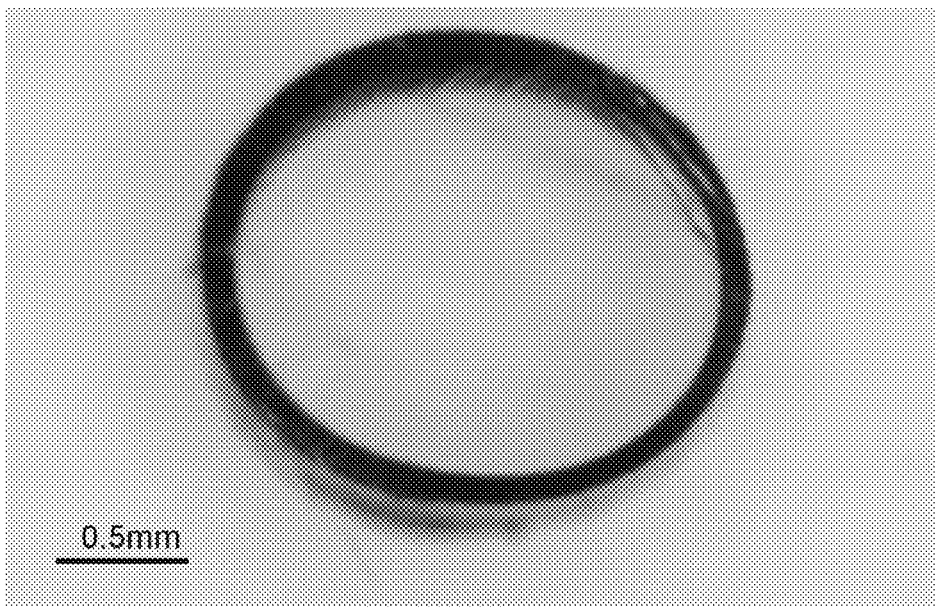
FIGS. 11 and 12 are photographs of cross-sectional segments of example semi-crystalline filaments of the present disclosure.
Figure 12:
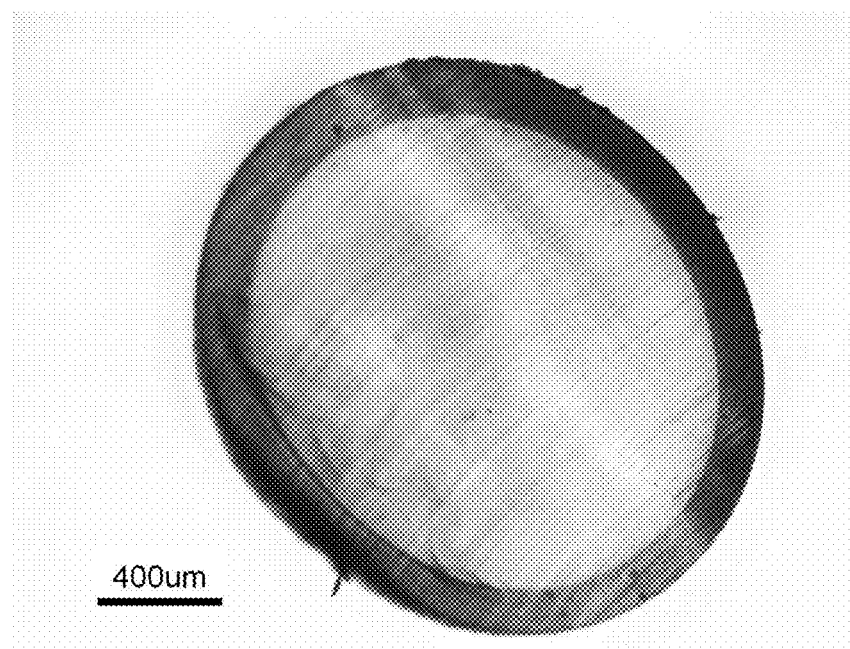

FIGS. 11 and 12 are photographs of cross-sectional segments of the semi-crystalline filaments of Examples 1 and 2, respectively. The shell portions of the semi-crystalline filaments are shown with darker shade dues to the colorant dyes. The core portions of the semi-crystalline filaments are shown with lighter shades.

The semi-crystalline filaments of Examples 1 and 2 were coextruded with varying feed rates to vary the volume fractions for the shell portions. The filament of Example 1 (shown in FIG. 11) had an average shell portion volume fraction of about 29%, and the filament of Example 2 (shown in FIG. 12) had an average shell portion volume fraction of about 43%.

Figure 13:
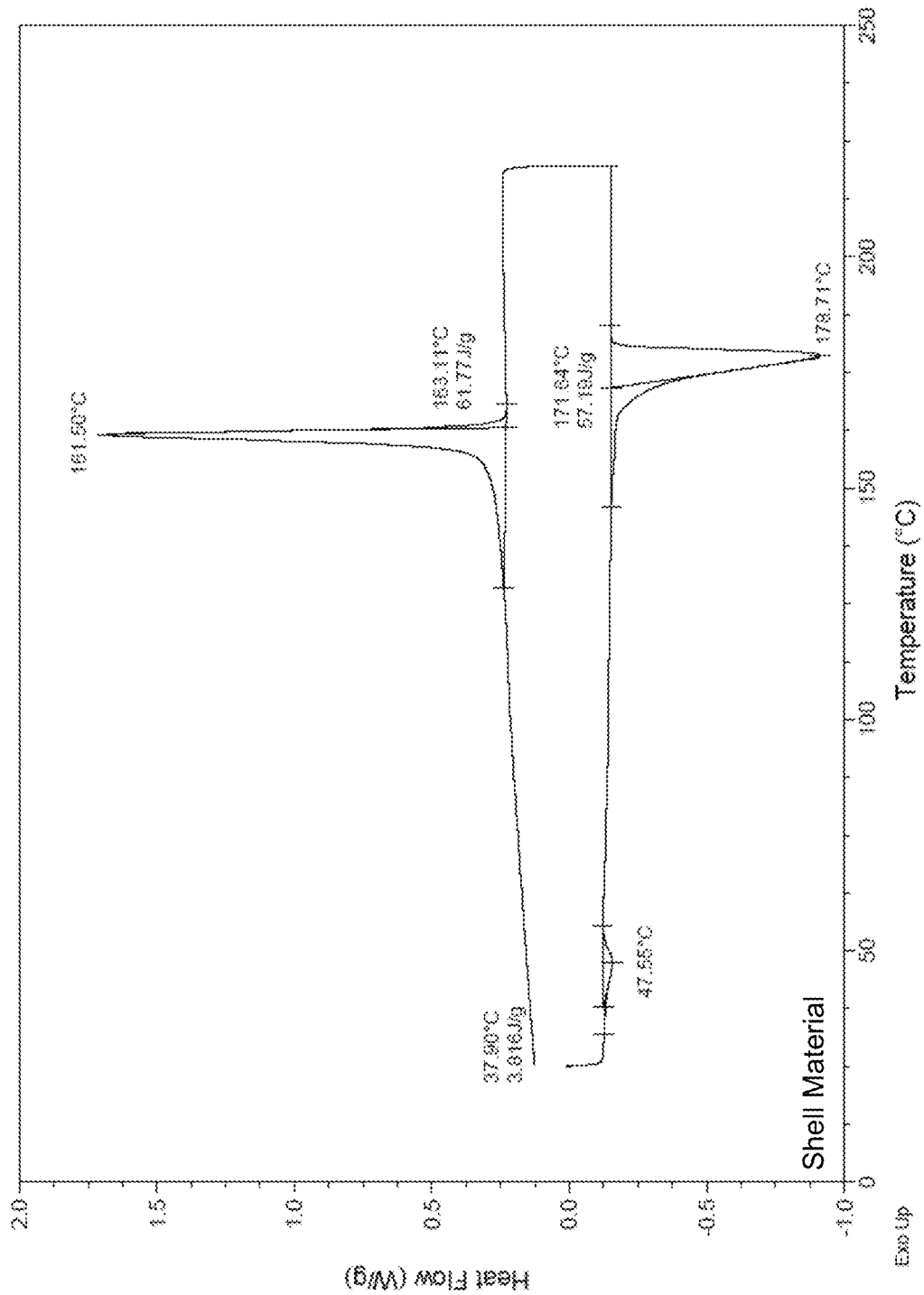
FIG. 13 is a differential scanning calorimetry plot of heat flow versus temperature for a shell material of the example semi-crystalline filaments.
Figure 14:
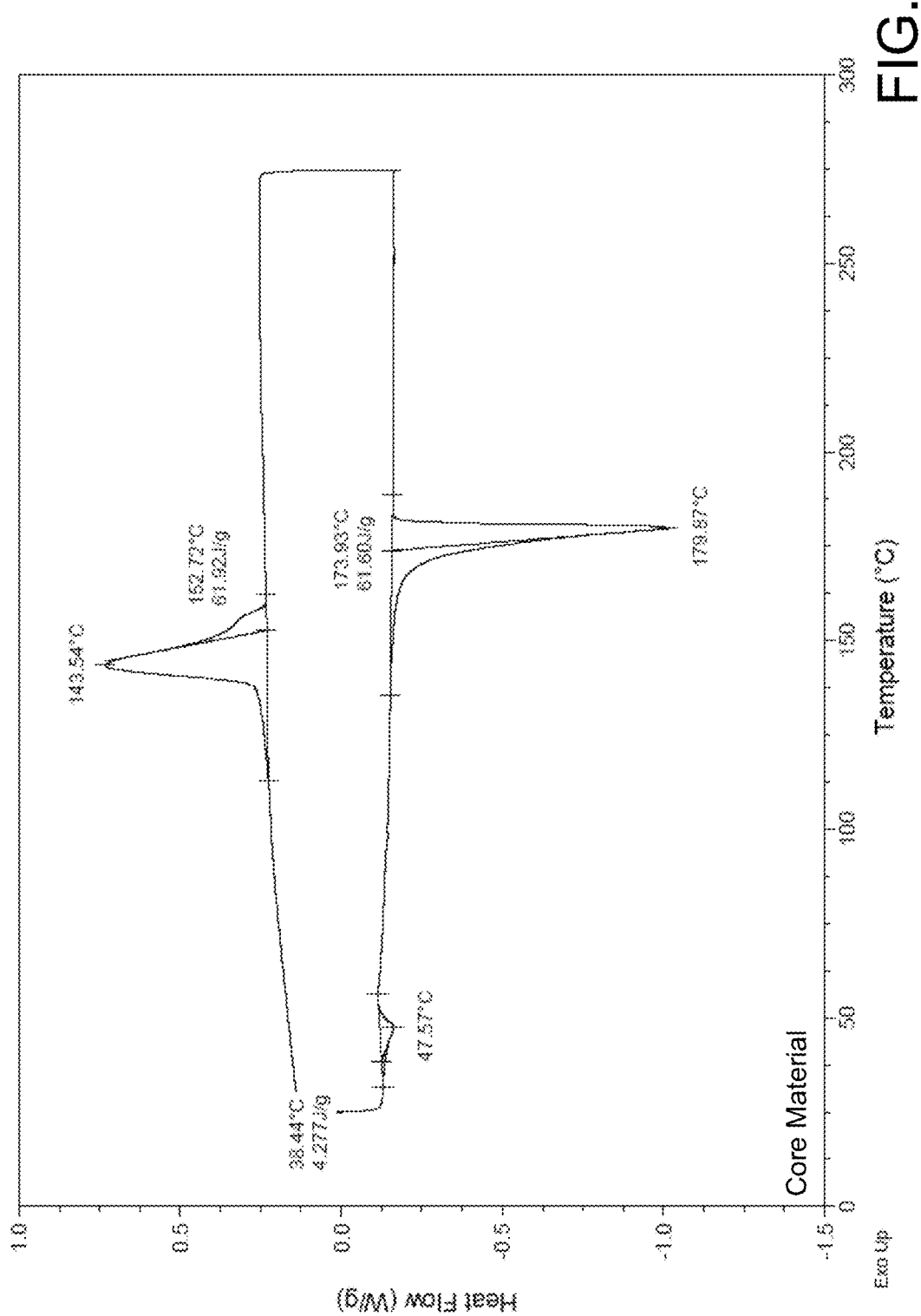
FIG. 14 is a differential scanning calorimetry plot of heat flow versus temperature for a core material of the example semi-crystalline filaments.

FIGS. 13 and 14 are respective DSC plots of the shell and core materials used to form the filaments of Examples 1 and 2. The DSC plots were measured using a differential scanning calorimeter commercially available under the trade designation "DSC Q2000" from TA Instruments, New Castle, Del., with a nitrogen atmosphere introduced at 50 cubic-centimeters/minute, and a heat increase rate of 10° C./minute. The sample size of the shell material was 5.1 milligrams, and the sample size of the core material was 5.9 milligrams.

As shown in the bottom plot of FIG. 13, during a heating phase, the shell material generated an endothermic melting peak, from which the peak melting temperature (about 179° C.) and the slope-intercept melting temperature (about 172° C.) were calculated. After melting, the shell material was allowed to cool down, as illustrated in the top plot of FIG. 13. While cooling down, the shell material generated an exothermic crystallization peak, from which the peak crystallization temperature (about 162° C.) and the slope-intercept crystallization temperature (about 163° C.) were calculated.

As shown in the bottom plot of FIG. 14, during a heating phase, the core material generated an endothermic melting peak, from which the peak melting temperature (about 180° C.) and the slope-intercept melting temperature (about 174° C.) were calculated. After melting, the core material was allowed to cool down, as illustrated in the top plot of FIG. 14. While cooling down, the core material generated an exothermic crystallization peak, from which the peak crystallization temperature (about 144° C.) and the slope-intercept crystallization temperature (about 153° C.) were calculated.

The calculated results from the DSC plots in FIGS. 13 and 14 provided a difference in the peak melting temperatures of about 1° C., a difference in the slope-intercept melting temperatures of about 2° C., a difference in the peak crystallization temperatures of about 18° C., and a difference in the slope-intercept crystallization temperatures of about 10° C. Accordingly, the inclusion of the nucleating agent in the shell material raised the crystallization temperature of the base polymer of the shell material (i.e., nylon-12 polyamide) relative to the same base polymer of the core material. As such, the shell and core materials of the semi-crystalline filaments of Examples 1 and 2 were suitable for crystallization in two stages.

Furthermore, the shell and core materials exhibited similar melting temperatures, thereby allowing both the shell and core materials to be readily melted within a liquefier of an extrusion head. This combination of a two-stage crystallization with similar melting temperatures renders the semi-crystalline filaments of Examples 1 and 2 suitable for extrusion from an extrusion-based layered deposition system to build 3D models that desirably have reduced levels of curling and distortion. As such, the 3D models may be built with semi-crystalline polymeric materials while maintaining dimensional accuracies.

The semi-crystalline filaments of Examples 1 and 2 were then used to build 3D models. FIGS. 14 and 16 are photographs of 3D models built with the exemplary semi-crystalline filaments. The 3D model shown in FIG. 15 was a cylinder having a diameter of 6 inches and a height of 8 inches. The 3D model shown in FIG. 16 had a star-shaped geometry. Each 3D model was built in an extrusion-based additive manufacturing system commercially available from Stratasys, Inc., Eden Prairie, Minn. under the trade designation "FDM TITAN". The filaments were melted in an extrusion head liquefier of the system at a set temperature range of 260° C. to 300° C., which was greater than the melting temperatures of the core and shell materials.

The molten materials were then extruded and deposited into a build chamber envelope maintained at a temperature range of about 160° C. to 180° C. This envelope temperature was close to the peak crystallization temperatures of the shell materials of the filaments, and greater than the peak crystallization temperatures of the core materials of the filaments. This allowed the deposited materials to crystallize in two stages, as discussed above, where the shell materials began crystallizing upon deposition and the core materials crystallized at later points in time, such as when the 3D models were removed from the build chamber.

Figure 15:
FIGS. 15 and 16 are photographs of 3D models built with a first example semi-crystalline filament of the present disclosure.
Figure 16:
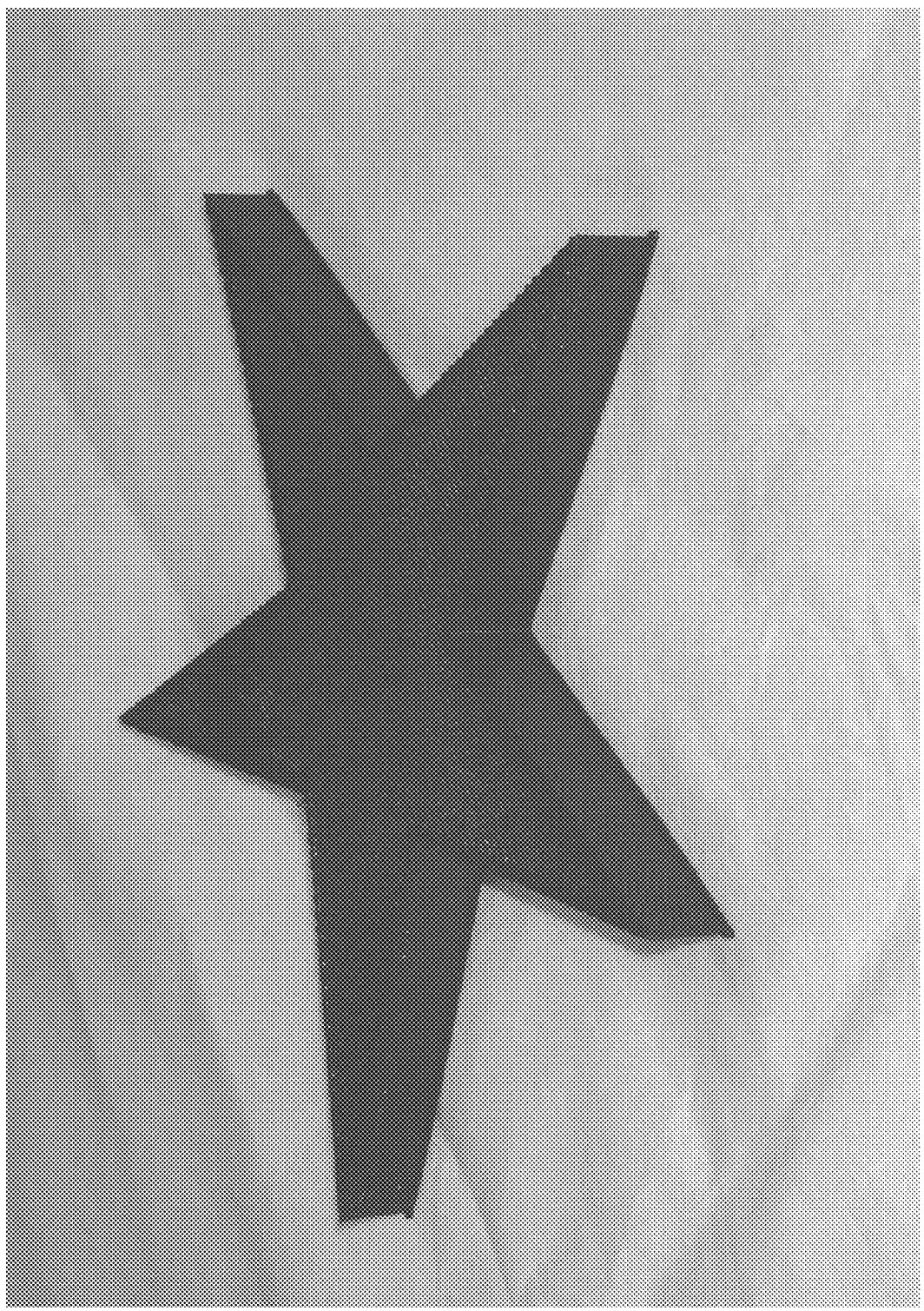

As shown in FIGS. 15 and 16, the 3D models were built with reduced levels of curling and distortion, and maintained dimensional accuracies. Furthermore, the 3D models were black in color from the black colorant of the shell material. This shows that the extruded roads of the molten materials retained their core/shell cross-sectional profile, as discussed above for core region 88 and shell region 90 of extruded road 86 (shown in FIG. 5). The 3D models also exhibited good interlayer z-bond strengths, which is believed to be due to the reduced rate at which the core material crystallized relative to the shell material.

Figure 17:
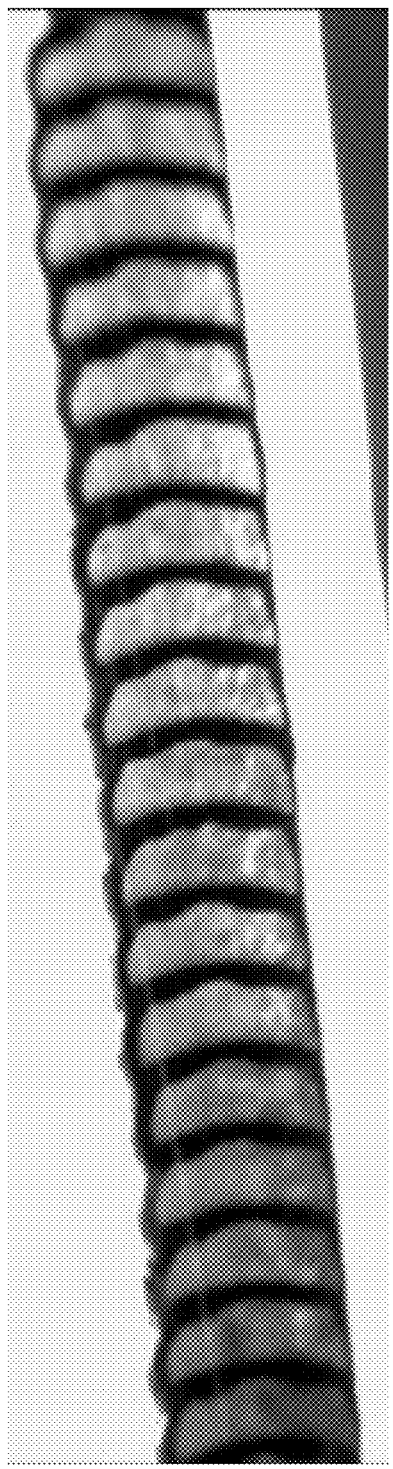
FIG. 17 is a photograph of cross-sectional profiles of extruded and solidified layers of a 3D model built with the first example semi-crystalline filament of the present disclosure.
Figure 18:
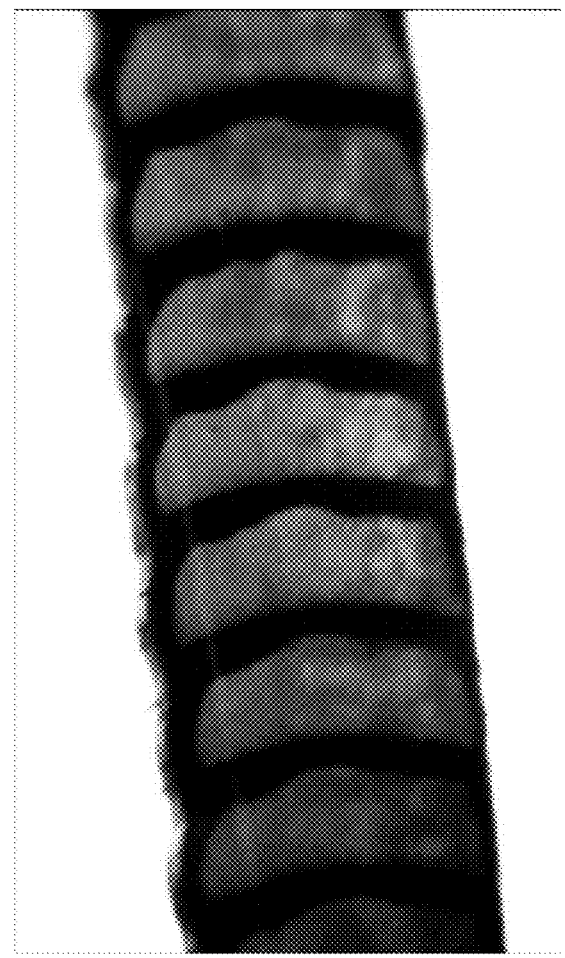
FIG. 18 is an expanded view photograph of cross-sectional profiles shown in FIG. 17.
Figure 19:
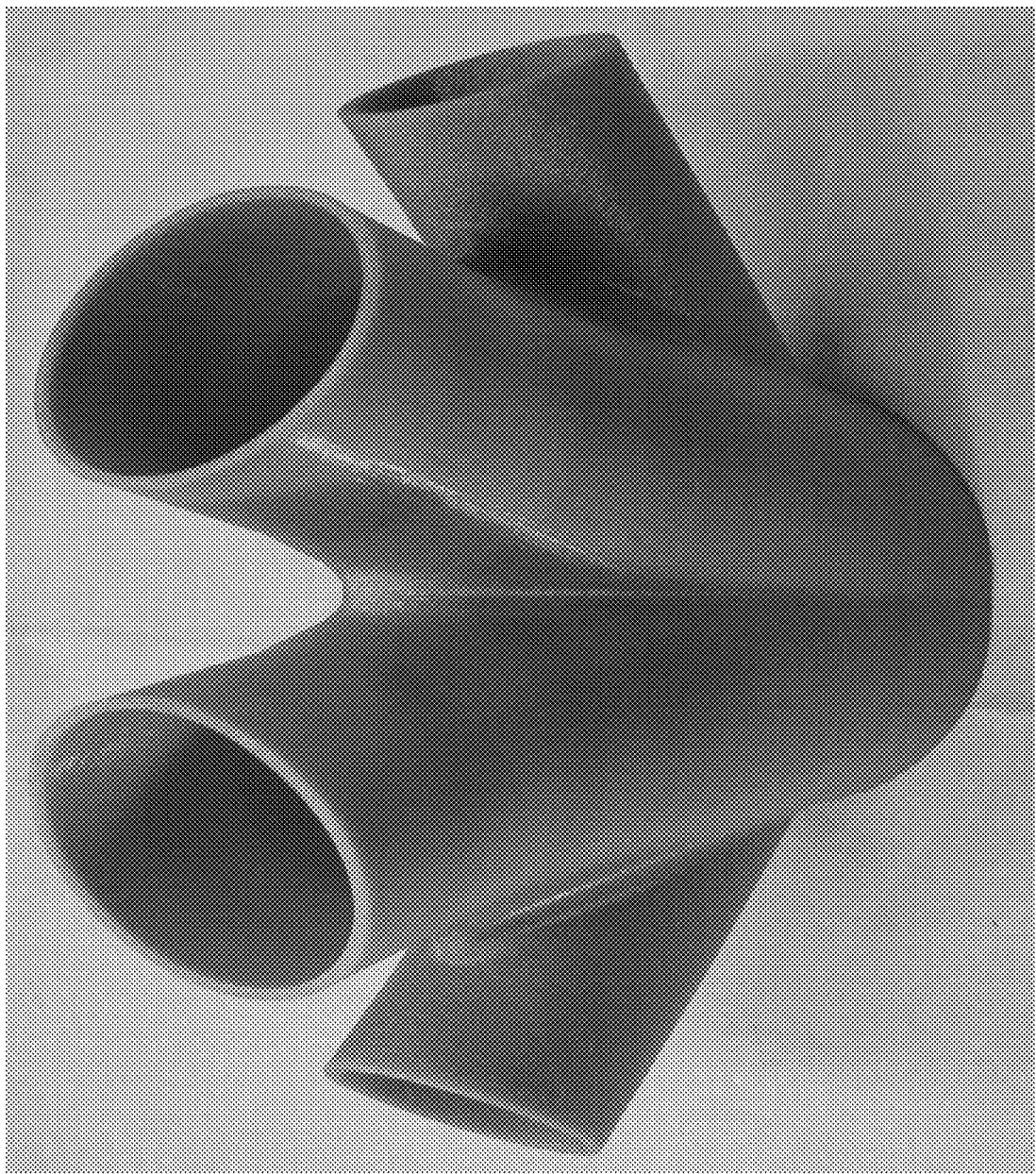
FIGS. 19-22 are photographs of 3D models built with a second example semi-crystalline filament of the present disclosure.
Figure 20:
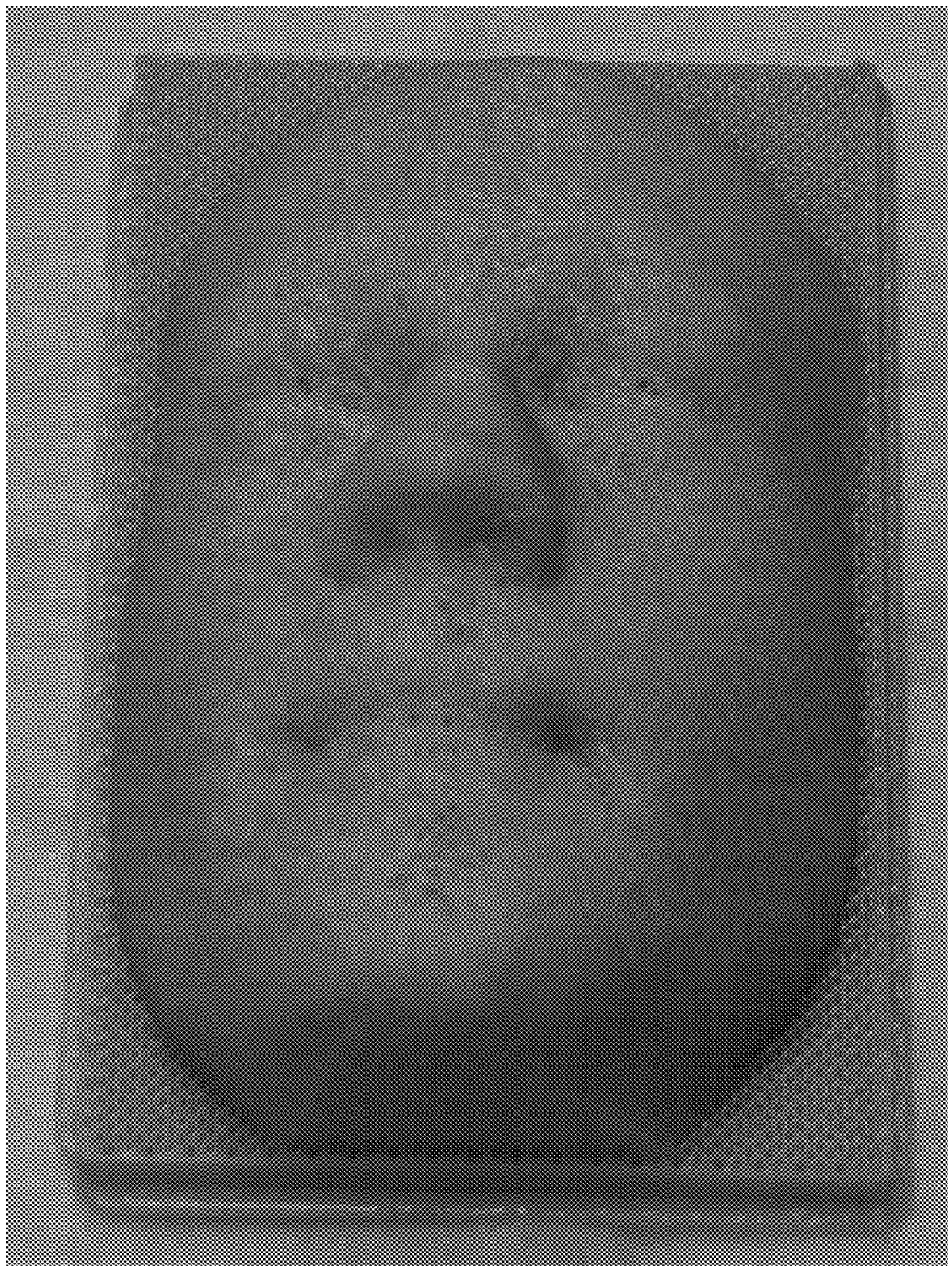
Figure 21:
Figure 22:
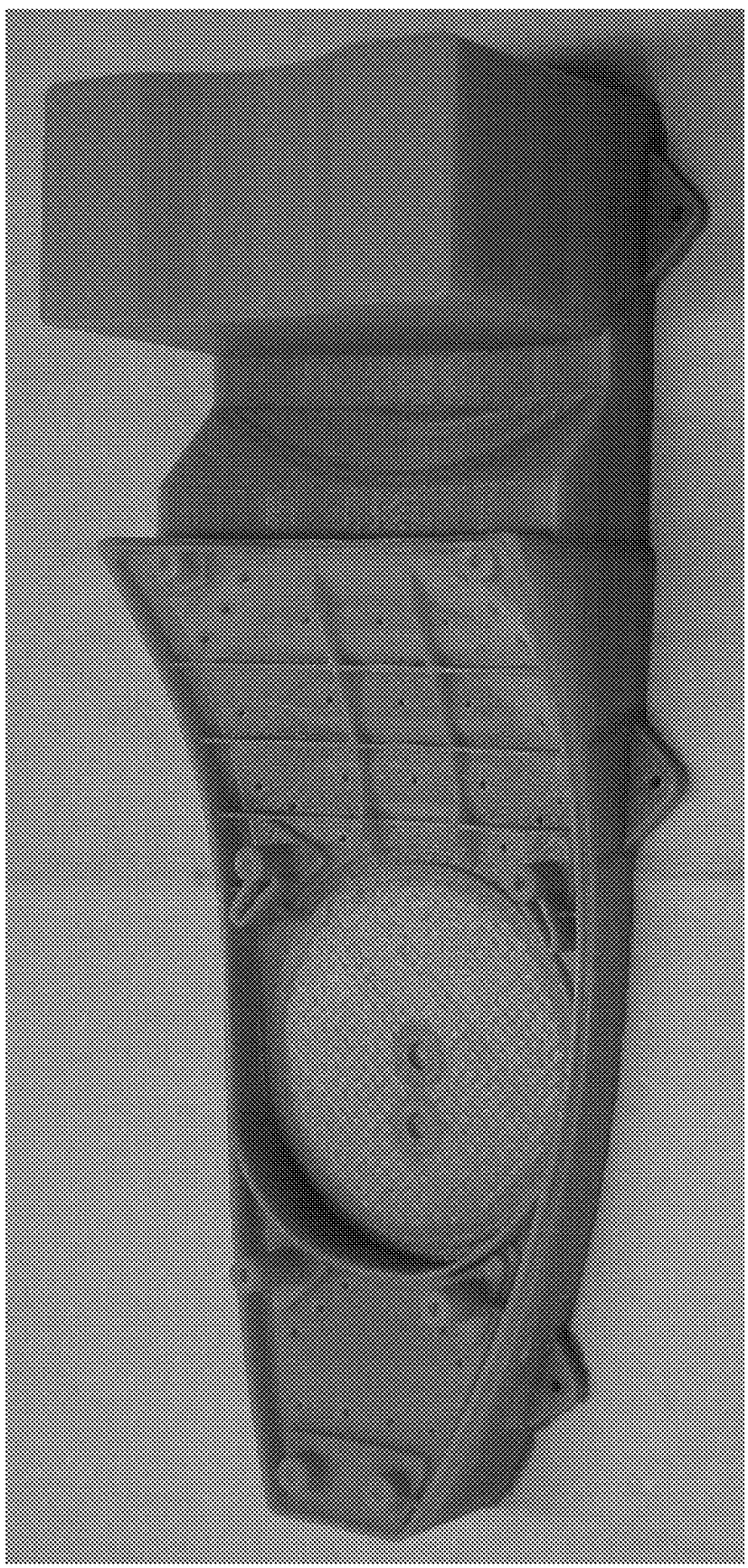

As shown in FIGS. 17 and 18, which illustrate multiple extruded roads formed vertically on top of each other. As can be seen, the extruded roads retained their core/shell cross-sectional profiles, where, for each extruded road, the clear core material formed a core region and the black shell material formed a shell region encasing the core material.

II. Example 3

Consumable, semi-crystalline filaments of Example 3 were also coextruded in a core and shell arrangement corresponding to filament 34 (shown in FIG. 2). The core material of the core portion included nylon-12 polyamide commercially available under the trade designation "GRILAMID L20" from EMS-Grivory, a unit of EMS-CHEMIE North America, Inc., Sumter, S.C. The shell material of the shell portion included a blend of the nylon-12 polyamide and a nucleating agent, where the nucleating agent also functioned as a clarifying agent. In this example, the shell material was dyed with an orange colorant. The shell material had a peak-crystallization temperature of about 170° C., and the core material had a peak-crystallization temperature of about 142° C.

The semi-crystalline filament of Example 3 was then used to build 3D models. FIGS. 19-22 are photographs of 3D models built with the exemplary semi-crystalline filaments. Each 3D model was built in an extrusion-based additive manufacturing system commercially available from Stratasys, Inc., Eden Prairie, Minn. under the trade designation "FDM TITAN". The filaments were melted in an extrusion head liquefier of the system at a set temperature range of 240° C. to 255° C., which was greater than the melting temperatures of the core and shell materials.

The molten materials were then extruded and deposited into a build chamber envelope maintained at a temperature range of about 170° C. This envelope temperature was about equal to the peak crystallization temperature of the shell material of the filament, and greater than the peak crystallization temperature of the core materials of the filament. This allowed the deposited materials to crystallize in two stages, as discussed above, where the shell materials began crystallizing upon deposition and the core materials crystallized at later points in time, such as when the 3D models were removed from the build chamber.

As shown in FIGS. 19-22, these 3D models were also built with reduced levels of curling and distortion, and maintained dimensional accuracies. Furthermore, the 3D models were orange in color from the orange colorant of the shell material. This shows that the extruded roads of the molten materials retained their core/shell cross-sectional profile, as discussed above for core region 88 and shell region 90 of extruded road 86 (shown in FIG. 5). The 3D models also exhibited good interlayer z-bond strengths, which, as discussed above, is believed to be due to the reduced rate at which the core material crystallized relative to the shell material.

Although the present disclosure has been described with reference to several embodiments, workers skilled in the art will recognize that changes may be made in form and detail without departing from the spirit and scope of the disclosure.

The invention claimed is:

1. A three-dimensional object built with an extrusion-based additive manufacturing system, the three-dimensional object comprising:
a plurality of solidified layers each comprising roads formed from a flowable consumable material that exits an extrusion tip of the extrusion-based additive manufacturing system, wherein the flowable consumable material exiting the extrusion tip comprises a core material and a shell material that is compositionally different from the core material, and wherein the shell material encases the core material to provide an interface between the core material and the shell material; and
wherein at least a portion of the roads of the plurality of solidified layers comprise core regions of the core material and shell regions of the shell material, and wherein the core regions and the shell regions substantially retain cross-sectional profiles corresponding to the interface between the core material and the shell material of the flowable consumable material.

2. The three-dimensional object of claim 1, wherein the core material and the shell material at least partially interdiffuse at the interface between the core material and the shell material.

3. The three-dimensional object of claim 1, wherein the core material comprises a first thermoplastic polymer.

4. The three-dimensional object of claim 3, wherein the shell material comprises a colorant.

5. The three-dimensional object of claim 4, wherein the shell material further comprises a second thermoplastic polymer.

6. The three-dimensional object of claim 5, wherein the first thermoplastic polymer of the core material comprises a first semi-crystalline polymeric material having a first peak crystallization temperature, and wherein the second thermoplastic polymer of the shell material comprises a second semi-crystalline polymeric material having a second peak crystallization temperature that is different than the first peak crystallization temperature.

7. The three-dimensional object of claim 1, wherein substantially all of the roads of the plurality of solidified layers comprise the core regions and the shell regions that retain cross-sectional profiles corresponding to the interface between the core material and the shell material of the flowable consumable material.

8. A three-dimensional object built with an extrusion-based additive manufacturing system, the three-dimensional object comprising:
a plurality of solidified layers each comprising roads formed from a flowable consumable material that exits an extrusion tip of the extrusion-based additive manufacturing system, wherein the flowable consumable material exiting the extrusion tip comprises a core material and a shell material that is compositionally different from the core material, and wherein the shell material encases the core material to provide an interface between the core material and the shell material; and
wherein at least a portion of the roads of the plurality of solidified layers comprise core regions of the core material and shell regions of the shell material, and wherein the core regions and the shell regions are substantially maintained after extrusion into the plurality of solidified layers.

9. The object of claim 8, wherein the shell comprises a first semi-crystalline polymer and the core comprises the first semi-crystalline polymer and a crystallization inhibitor.

10. The object of claim 8, wherein the shell comprises a first semi-crystalline polymer and one or more nucleating agents and the core comprises the first semi-crystalline polymer.

11. The object of claim 8, wherein the core comprises a majority of a first semi-crystalline polymer and the shell comprises a majority of a second semi-crystalline polymer.

12. The object of claim 11, wherein a difference in melting points of the first semi-crystalline polymer and the second semi-crystalline polymer is about 8° C. or less.

13. The object of claim 11, wherein a difference in melting points of the first semi-crystalline polymer and the second semi-crystalline polymer is about 3° C. or less.

14. The object of claim 8, wherein the core and the shell each comprise polyamides, polyethylenes, polypropylenes, polyetheretherketones, polyetherarylketones, perfluoroalkoxys, polychlorotrifluoroethylenes, polyphenylene sulfides, fluorinated ethylene propylenes, polytetrafluoroethylenes, ethylene-tetrafluoroethylenes, polyvinylidene fluorides, and ethylene-chlorortifluoroethylenes, copolymers thereof, and combinations thereof.

15. The object of claim 14, wherein the polyamides comprise aliphatic nylon polyamides, such as nylon 6, nylon 6-6, nylon 6-10, nylon 6-12, nylon 10, nylon 10-10, nylon 11, nylon 12, and combinations thereof, wherein the polyethylenes include low-density polyethylene, medium-density polyethylene, high-density polyethylene, and combinations thereof, and wherein the polypropylenes include isotactic polypropylenes, syndiotactic polypropylenes, branched and linear variations thereof, and combinations thereof.

16. A three-dimensional object built with an extrusion-based additive manufacturing system, the three-dimensional object comprising:
a plurality of solidified layers each comprising roads formed from a flowable consumable material that exits an extrusion tip of the extrusion-based additive manufacturing system, wherein the flowable consumable material exiting the extrusion tip comprises a core material and a shell material that is different from the core material, and wherein the shell material encases the core material to provide an interface between the core material and the shell material wherein the core material and the shell material are semi-crystalline materials having peak crystallization temperatures that have at least a 2° C. or greater difference; and
wherein at least a portion of the roads of the plurality of solidified layers comprise core regions of the core material and shell regions of the shell material, and wherein the core regions and the shell regions are substantially maintained after extrusion into the plurality of solidified layers.

17. The three-dimensional object of claim 16, wherein the peak crystallization temperatures of the semi-crystalline core material and the semi-crystalline shell material are at least a 10° C. or greater in difference.

18. The three-dimensional object of claim 16, wherein the peak crystallization temperatures of the semi-crystalline core material and the semi-crystalline shell material are less than 25° C. or less in difference.

* * * * *